US006271332B1

(12) United States Patent
Lohmann et al.

(10) Patent No.: US 6,271,332 B1
(45) Date of Patent: Aug. 7, 2001

(54) POLYURETHANES MADE FROM POLYSILOXANE/POLYOL MACROMERS

(75) Inventors: Dieter Lohmann, Münchenstein (CH); Jens Höpken, Lörrach (DE); Angelika Domschke, Duluth, GA (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 09/091,394

(22) PCT Filed: Dec. 10, 1996

(86) PCT No.: PCT/EP96/05507

§ 371 Date: Apr. 20, 1999

§ 102(e) Date: Apr. 20, 1999

(87) PCT Pub. No.: WO97/23532

PCT Pub. Date: Jul. 3, 1997

(30) Foreign Application Priority Data

Dec. 22, 1995 (EP) .................................................. 95810818

(51) Int. Cl.[7] .................................................. C08G 77/26
(52) U.S. Cl. ........................ 528/28; 428/447; 351/160 R; 623/5; 623/6
(58) Field of Search .............................. 528/28; 428/447; 351/160 R; 623/5, 6

(56) References Cited

U.S. PATENT DOCUMENTS

| 4,737,558 | | 4/1988 | Falcetta | 526/279 |
| 4,942,212 | * | 7/1990 | Hanada et al. | 528/28 |
| 4,962,178 | | 10/1990 | Harisiades | 528/33 |
| 5,196,458 | | 3/1993 | Nunez et al. | 523/106 |
| 5,221,724 | * | 6/1993 | Li et al. | 528/28 |
| 5,426,158 | | 6/1995 | Mueller et al. | 525/45 |
| 5,430,121 | * | 7/1995 | Pudleiner et al. | 528/28 |
| 5,589,563 | * | 12/1996 | Ward et al. | 528/44 |
| 6,039,913 | * | 3/2000 | Hirt et al. | 264/331.11 |

FOREIGN PATENT DOCUMENTS

| 217364 | 10/1986 | (EP) . |
| 362145 | 9/1989 | (EP) . |
| 369590 | 9/1989 | (EP) . |
| 473812 | 9/1990 | (EP) . |
| 586332 | 7/1993 | (EP) . |
| WO 96/10595 | 4/1996 | (EP) . |

OTHER PUBLICATIONS

Rompp Chemie Lexikon, Falbe, Dr. J., et al, pp. 583–584 (No English version available).
Enzymatic Grafting of Amylose from Poly (dimethylsiloxanes), Braunmuehl, Volker v., et al, Macromolecules, 1995, 28, pp. 17–24.

* cited by examiner

Primary Examiner—Margaret G. Moore
(74) Attorney, Agent, or Firm—R. Scott Meece; Robert J. Gorman, Jr.

(57) ABSTRACT

The present invention describes a polymer and a precursor thereof; a prepolymer made essentially from a macromer that is cross-linked, for example, via its free hydroxy groups with a polyisocyanate, the macromer being made essentially from a polysiloxane and a polyol component; processes for the production of such prepolymers and polymers; the use of such polymers, for example, as artificial corneas, as molded articles, especially as contact lens material; also the use of a prepolymer or polymer for coating surfaces, especially functionalized polymer surfaces.

55 Claims, No Drawings

POLYURETHANES MADE FROM POLYSILOXANE/POLYOL MACROMERS

The present invention describes a polymer and a precursor thereof; a prepolymer made essentially from a macromer that is, for example, crosslinked via its free hydroxy groups with a polyisocyanate, a macromer being made essentially from a polysiloxane and a polyol component; methods of producing such prepolymers and polymers; the use of such polymers, for example as artificial corneas, as moulded articles, especially as contact lens material; also the use of a prepolymer or polymer for coating surfaces, especially functionalised polymer surfaces.

JP 62/068 820 and JP 63/139 106 (Kao Corporation) describe a polymer consisting of a polysiloxane that carries at least one primary amino group via which the polysiloxane has been modified by a sugar radical. Such modified polysiloxanes are recommended as additives for haircare products.

WO 83/01617 (Minnesota Mining) describes inter alia a macromer that is a methacryl-amidoacyl or acrylamidoacyl derivative of a polysiloxane. According to that publication, such siloxane derivatives can be used as coatings or films.

EP 362 145 (Ciba-Geigy) describes a contact lens that is produced by reacting a polydialkylsiloxane prepolymer containing terminal isocyanate with a polydialkylsiloxane di- or poly-alkanol.

R. Stadler et al. (Macromolecules 28, 17–24 (1995)) describe polysiloxanes having pendant gluconamide or maltoheptaoneamide groups, the synthesis of which starts, for example, from the corresponding peracylated N-allylaldoneamides which are added to a Si—H group of a corresponding polysiloxane by hydrosilylation using a rhodium or platinum catalyst.

JP 52/29084 (Toray Industries) describes a polyurethane resin that is used as an electro-photographic recording layer. The polyurethane in that specification is made up of a poly-siloxane containing, terminally or pendently, at least two hydroxy groups, a polyisocyanate, especially a diisocyanate, and a polyol, such as ethylene glycol or propylene glycol, as a chain extending agent.

Contact lens materials having a high siloxane content are known and are valued because, as a rule, those materials have the high oxygen permeability required of a contact lens material. However, they often bring with them the following disadvantageous properties: loss of comfort for the contact lens wearer owing to mechanical rigidity, reduction in oxygen permeability when the material used has a relatively high water content, and a refractive index that is too low for good optical properties. Contact lens materials having relatively low refractive indices are thicker than those having relatively high refractive indices and are therefore less comfortable to wear. In addition, the frightening suction-cup effect of a lens can occur, restricting the ability of the lens to move on the eye.

The problem mentioned is solved by the disclosure of polymers that are obtainable, for example, by the thermal polymerisation of a polysiloxane/polyol macromer with a polyisocyanate, such a macromer being made from an amino- or hydroxy-alkylated polysiloxane linked to at least one polyol component and, in some cases, via a bifunctional organic radical. A special property of polysiloxane/polyol macromers is that they undergo microphase separation and that crosslinking via urethane groups takes place exclusively in the polyol phase. The microphase separation, which is hydrophilic/hydrophobic, is in the range <200 nm, with the result that the materials have a high degree of optical clarity and photopermeability. Reversible physical interactions, such as hydrogen bridging, have an additional stabilising effect. The continuous siloxane phases existing in a composite phase produce a surprisingly high degree of oxygen permeability. The second microphase, consisting mainly of polyol, is capable of storing water, with the result that the material as a whole acquires a hydrophilic character but does not lose its optical clarity and high oxygen permeability. In addition, the stored water generally has a positive effect on the mechanical relaxation properties of the material.

The present invention relates to a polymer comprising a polymerisation product of at least one macromer that comprises at least one section of formula (I)

$$-a-Z-b- \tag{I}$$

wherein (a) is a polysiloxane segment containing at least one primary amino group or at least one hydroxy group, (b) is a polyol segment containing at least 4 carbon atoms, Z is a segment (c) or a group $X_1$, segment (c) being defined as $X_2$—R—$X_2$ wherein R is a bivalent radical of an organic compound having up to 25 carbon atoms and each $X_2$ independently of the other is a bivalent radical having at least one carbonyl group, and $X_1$ having the same meaning as $X_2$; with a polyisocyanate.

A polysiloxane segment (a) is derived from a compound of formula (II)

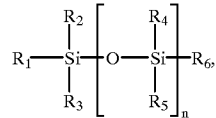

(II)

wherein n is an integer from 5 to 500; 99.8–25% of the radicals $R_1$, $R_2$, $R_3$, $R_4$, $R_5$ and $R_6$ are each independently of the others alkyl and 0.2–75% of the radicals $R_1$, $R_2$, $R_3$, $R_4$, $R_5$ and $R_6$ are each independently of the others partially fluorinated alkyl, aminoalkyl, alkenyl, aryl, cyanoalkyl, Alk-NH-Alk-NH$_2$ or Alk-(OCH$_2$CH$_2$)$_m$—(O CH$_2$)$_p$—OR$_7$, wherein $R_7$ is hydrogen or lower alkyl, Alk is alkylene, m and p are each independently of the other an integer from 0–10; and a molecule contains at least one primary amino group or at least one hydroxy group.

The alkyleneoxy groups —(OCH$_2$CH$_2$)$_m$— and —(OCH$_2$)$_p$— in a ligand Alk-(OCH$_2$CH$_2$)$_{m—(OCH2)_p}$—OR$_7$ are distributed either randomly or as blocks in a chain.

A polysiloxane segment (a) is linked a total of 1–50 times, preferably 2–30 times, and especially 4–10 times, via a group Z to a segment (b) or to a further segment (a), Z in an a-Z-a sequence always being a segment (c).

In a segment (a) the site of linkage to a group Z is an amino or hydroxy group reduced by a hydrogen atom.

In a preferred definition, a polysiloxane segment is derived from a compound of formula (II) wherein the radicals $R_1$, $R_2$, $R_3$, $R_4$, $R_5$ and $R_6$ are a total of 1–50 times, preferably 2–30 times and especially 2–10 times, each independently of the others either terminal or pendant aminoalkyl or hydroxyalkyl and wherein the remaining variables are as defined hereinbefore.

In a preferred embodiment, a polysiloxane segment is derived from a compound of formula (II) wherein 95–29% of the radicals $R_1$, $R_2$, $R_3$, $R_4$, $R_5$ and $R_6$ are each independently of the others alkyl and 5–71% of the radicals $R_1$, $R_2$, $R_3$, $R_4$, $R_5$ and $R_6$ are each independently of the others partially fluorinated alkyl, aminoalkyl, alkenyl, aryl, cyanoalkyl, Alk-NH-Alk-NH$_2$ or Alk-(OCH$_2$CH$_2$)$_m$—(OCH$_2$)$_p$—OR$_7$, and wherein the other variables are as defined hereinbefore.

In another preferred embodiment, a polysiloxane segment is derived from a compound of formula (II) wherein 95–29% of the radicals $R_1$, $R_2$, $R_3$, $R_4$, $R_5$ and $R_6$ are each independently of the others lower alkyl and 5–71% of the radicals $R_1$, $R_2$, $R_3$, $R_4$, $R_5$ and $R_6$ are each independently of the others partially fluorinated alkyl, aminoalkyl or hydroxyalkyl.

In a preferred definition, n is an integer from 5 to 400, preferably from 10 to 250 and especially from 12 to 125.

In a preferred definition, the two terminal radicals $R_1$ and $R_6$ are aminoalkyl or hydroxyalkyl, the other variables being as defined hereinbefore.

In a further preferred definition, the radicals $R_4$ and $R_5$ are 1–50 times, preferably 2–30 times and especially 4–10 times, pendant aminoalkyl or hydroxyalkyl, the other variables being as defined hereinbefore.

In a further preferred definition, the radicals $R_1$, $R_2$, $R_3$, $R_4$, $R_5$ and $R_6$ are a total of 1–50 times, preferably 2–30 times and especially 2–10 times, each independently of the others either terminal or pendant aminoalkyl or hydroxyalkyl, the other variables being as defined hereinbefore.

In a further preferred definition, the radicals $R_1$ and $R_6$ are a total of 1–2 times and especially 1.5 times, terminal aminoalkyl or hydroxyalkyl, the other variables being as defined hereinbefore.

In a further preferred definition, the radicals $R_1$ and $R_6$ are a total of 1–2 times and especially 1.5 times, terminal amino-lower alkyl or hydroxy-lower alkyl, and $R_2$, $R_3$, $R_4$ and $R_5$ being independently of each other $C_1$–$C_4$alkyl.

In a further preferred definition, the radicals $R_1$ and $R_6$ are a total of 1–2 times and especially 1.5 times, terminal amino-$C_1$–$C_4$alkyl or hydroxy-$C_1$–$C_4$alkyl, and $R_2$, $R_3$, $R_4$ and $R_5$ being independently of each other $C_1$–$C_2$alkyl.

In a further preferred definition, the radicals $R_1$ and $R_6$ are a total of 1–2 times and especially 1.5 times, terminal amino-$C_1$–$C_4$alkyl or hydroxy-$C_1$–$C_4$alkyl, and $R_2$, $R_3$, $R_4$ and $R_5$ being methyl.

Of course, any indication of the number of above-mentioned ligands $R_1$ to $R_6$ relates to a statistical average, both as regards the description of position (pendently and terminally) and as regards the numerical description (number of ligands).

When Z is $X_1$, $X_1$ is a bivalent radical having at least one carbonyl group. Typically, a mentioned carbonyl group may be flanked at most twice by —O—, —CONH—, —NHCO— or —NH—. Examples of bivalent groups Z are, for example, carbonyls, esters, amides, urethanes, ureas or carbonates. $X_1$ is preferably an ester, amide, urethane or urea group, especially an ester or amide group.

$X_2$ has the same definition as $X_1$ and is preferably an ester, amide, urethane, carbonate or urea group, especially an ester, amide, urethane or urea group and more especially an amide, urethane or urea group.

When Z in formula (I) is $X_1$, a polyol segment (b) is understood to be, preferably, a polyol derived from a carbohydrate, carbohydrate monolactone or carbohydrate dilactone. A carbohydrate is understood to be, preferably, a mono-, di-, tri-, tetra-, oligo- or poly-saccharide. A carbohydrate lactone is understood to be, preferably, the lactone of an aldonic or uronic acid. An aldonic or uronic acid is, for example, a carboxylic acid formed by the oxidation of a mono-, di-, tri-, tetra-, oligo- or poly-saccharide. Examples of aldonic acid lactones are gluconolactone, galactonolactone, lactobionolactone and maltoheptaonolactone; examples of uronic acid lactones are glucuronic acid lactone, mannuronic acid lactone or iduronic acid lactone. An example of a carbohydrate dilactone is D-glucaro-1,4:6,3-dilactone.

In the above, a polyol segment (b) is preferably derived from gluconolactone, galactonolactone, lactobionolactone, maltoheptaonolactone, from glucuronic acid lactone, mannuronic acid lactone, iduronic acid lactone or from D-glucaro-1,4:6,3-dilactone.

A carbohydrate lactone reacts, for example, with a primary amino group or a hydroxy group of segment (a) to form a covalent amide or ester bond of type $X_1$. Such linkages are part of a further preferred form of macromers that are derived from compounds of formula (I). Such macromers are typically characterised by an alternating distribution of segments of types (a) and (b), interrupted by $X_1$.

Preferably, a polyol segment (b) may be derived from a polyol that does not carry a lactone group when the group Z is a segment (c). Examples of such polyols are: a 1,2-polyol, such as a reduced monosaccharide, for example mannitol, glucitol, sorbitol or iditol, a 1,3-polyol, such as polyvinyl alcohol (PVA), which is derived, for example, from partially or fully hydrolysed polyvinyl acetate, also amino-terminal PVA telomers, aminopolyols, aminocyclodextrins, aminoalkylcyclodextrins, amino-mono-, -di-, -tri-, -oligo- or -poly-saccharides, or cyclodextrin derivatives, such as hydroxypropyl α-, β- or γ-cyclodextrin. A carbohydrate dilactone mentioned above can be reacted, for example, with preferably two equivalents of an amino-terminal PVA telomer to form a polyol macromer carrying in its central portion the carbohydrate compound derived from the dilactone. Such combined polyols are likewise understood by "a suitable polyol".

In the above, a polyol segment (b) is preferably derived from mannitol, glucitol, sorbitol, iditol, polyvinyl alcohol, an aminocyclodextrin, hydroxypropyl α-, β- or γ-cyclodextrin.

In a segment (b) the site of linkage to a segment (c) is an amino or hydroxy group reduced by a hydrogen atom.

In a preferred embodiment, the segment (c) is $X_2$—R—$X_2$, wherein R is a bivalent radical of an organic compound having up to 25 carbon atoms and each $X_2$ independently of the other is an an amide, urethane or urea group.

In a further preferred definition the segment (c) is $X_2$—R—$X_2$, wherein R is alkylene or arylene having up to 12 carbon atoms, or a saturated bivalent cycloaliphatic group having from 6 to 14 carbon atoms and each $X_2$ independently of the other is an amide, urethane or urea group.

A di-radical R is, for example, alkylene that may be interrupted one or more times by a bivalent structural unit Y, Y being selected from di-lower alkylsilyl and di-lower alkylsilyloxy, or R may be arylene, alkylenearylene, arylenealkylene or arylenealkylenearylene having up to 20 carbon atoms, a saturated bivalent cycloaliphatic group having from 6 to 20 carbon atoms or cycloalkylenealkylenecycloalkylene having from 7 to 20 carbon atoms.

In a preferred definition, R is alkylene that may be interrupted one or more times by a bivalent structural unit Y, Y being selected from di-lower alkylsilyl and di-lower alkylsilyloxy, or R may be arylene, alkylenearylene, arylenealkylene or arylenealkylenearylene having up to 14 carbon atoms, or a saturated bivalent cycloaliphatic group having from 6 to 14 carbon atoms.

In a preferred definition, R is alkylene that may be interrupted one or more times by a bivalent structural unit Y, Y being selected from di-lower alkylsilyl and di-lower alkylsilyloxy, or R may be arylene, alkylenearylene or arylenealkylene having up to 14 carbon atoms, or a saturated bivalent cycloaliphatic group having from 6 to 14 carbon atoms.

In a preferred definition, R is alkylene or arylene having up to 12 carbon atoms, or a saturated bivalent cycloaliphatic group having from 6 to 14 carbon atoms.

In a preferred definition, R is alkylene or arylene having up to 10 carbon atoms, or a saturated bivalent cycloaliphatic group having from 6 to 10 carbon atoms.

Y is preferably dimethylsilyl or dimethylsilyloxy. A bivalent structural unit Y may be present several times, in which case it is preferable for a Y to be followed by a further Y. A bivalent structural unit Y may be present preferably 1–10 times, and especially 2–4 times. An example of two successive Ys is tetramethyldisiloxanyl.

In a greatly preferred definition, a segment (c) is derived from a likewise preferred diisocyanate OCN—R—NCO and is, for example, hexane-1,6-diisocyanate, 2,2,4-trimethylhexane-1,6-diisocyanate, 1,3bis(3-isocyanatopropyl)tetramethyldisiloxane, tetramethylene diisocyanate, phenylene-1,4-diisocyanate, toluene-2,4-diisocyanate, toluene-2,6-diisocyanate, m- or p-xylene diisocyanate, isophorone diisocyanate, cyclo-hexane-1,4-diisocyanate, 1,5-naphthylene diisocyanate, 4,4'-diphenylmethane diisocyanate, 4,4'-diphenylsulfone diisocyanate or 4,4'-dicyclohexylmethane diisocyanate.

A preferred form of segment (c) is, furthermore, derived from a diisocyanate, the isocyanate groups having different reactivities. The different reactivity is influenced especially by the spatial requirements and/or electron density in the vicinity of an isocyanato group.

There is understood by a polyisocyanate an organic compound that contains up to 50 carbon atoms and carries two or three isocyanato groups per molecule, the isocyanato groups each being bonded to different atoms in the molecule. Within the scope of the present invention, a polyisocyanate is understood to be preferably a diisocyanate.

A preferred polyisocyanate is, for example, a diisocyanate of the type OCN—D—NCO, wherein D is a bivalent radical of an organic compound having up to 50 carbon atoms. Otherwise, the radical D is subject, one independently of the other, to the same definitions and preferences as those mentioned hereinbefore for the bivalent radical R in connection with segment (c).

Greatly preferred examples of a polyisocyanate are diisocyanates having isocyanate groups of different reactivity and are preferably, for example, compounds such as hexane-1, 6-diisocyanate, 2,2,4-trimethylhexane-1,6-diisocyanate, 1,3-bis(3-isocyanato-propyl)tetramethyldisiloxane, tetramethylene diisocyanate, phenylene-1,4-diisocyanate, toluene-2,4-diisocyanate, toluene-2,6-diisocyanate, m- or p-xylene diisocyanate, isophorone diisocyanate, cyclohexane-1,4-diisocyanate, 1,5-naphthylene diisocyanate, 4,4'-diphenylmethane diisocyanate, 4,4'-diphenylsulfone diisocyanate or 4,4'-dicyclohexylmethane diisocyanate.

A polyisocyanate is also understood to include a triisocyanate

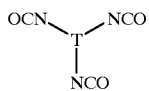

wherein T is an organic radical having up to 50 carbon atoms.

A radical T is, for example, a saturated unsubstituted or substituted, for example lower alkoxy- or aryl-substituted, hydrocarbon, which may be interrupted by one or more hetero atoms or by one or more groups selected from —OCONH—, —NHCOO—, —CONH— and —NHCO—, or T is, for example, a saturated polyamide that may be substituted by lower alkyl or by aryl, or T is, for example, a carbocyclic or heterocyclic aromatic radical that may be unsubstituted or substituted, for example, by lower alkyl, lower alkoxy or by aryl, a radical T containing preferably up to 40, and especially up to 30, carbon atoms.

Preference is given especially to triisocyanates that are obtainable by reacting a compound containing preferably three acid hydrogen atoms with one of the preferred diisocyanates described hereinbefore. Compounds that preferably contain three acid hydrogen atoms are to be understood as being, for example, amines, such as ammonia, polyols, such as glycerol, or amides, such as cyanuric acid, a triisocyanate containing preferably up to 40 carbon atoms and especially up to 30 carbon atoms.

Preference is given also to triisocyanates that are present in the form of trimers of a preferred diisocyanate mentioned hereinbefore, such as trimers of 1,4-phenylene diisocyanate, 2,4-toluylene diisocyanate or 2,6-toluylene diisocyanate, containing preferably up to 40 carbon atoms and especially up to 30 carbon atoms. An example of a trimer of the mentioned type is a compound of formula (T3) below.

Preferred examples of triisocyanates are compounds of formula (T1), (T2) or (T3)

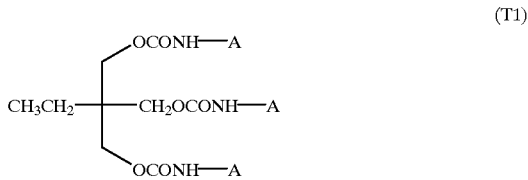

(T1)

(T2)

(T3)

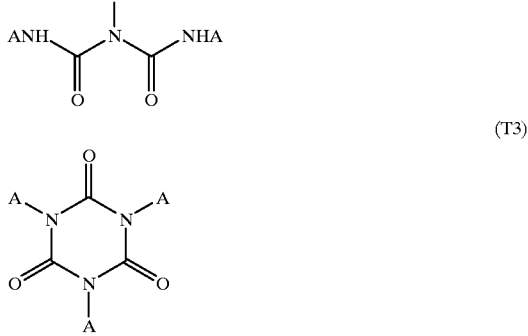

wherein each A, independently of the others, is —(CH$_2$)$_6$—NCO or

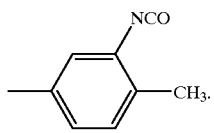

Those compounds are, especially, known triisocyanates commercially available under the names Desmodur®L, Desmodur®N or Desmodur®N-3000, and Mondur®CB.

The average molecular weight of a macromer used hereinbefore is preferably in the range from approximately 300 to approximately 30 000, especially in the range from approximately 500 to approximately 20 000, more especially in the range from approximately 800 to approximately 12 000 and above all in the range from approximately 1000 to approximately 10 000.

The ratio of segments (a) and (b) in a macromer used hereinbefore is preferably in a range of (a):(b)=3:4, 2:3, 1:2, 1:1, 1:3 or 1:5.

Any ratio that is given is typically a rounded number. That means that it may include a value above or below a whole number, since the numbers are rounded off in accordance with the customary rules. For example, in a ratio of 1:5, the number 5 may, for example, assume any value within the range from 4.50 to 5.49.

The sum total of segments (a) and (b) or, where appropriate, (a) and (b) and (c) is in a range from 2 to 50, preferably from 3 to 30 and especially in the range from 3 to 12.

Alkyl has up to 20 carbon atoms and may be linear or branched. Suitable examples include dodecyl, octyl, hexyl, pentyl, butyl, propyl, ethyl, methyl, 2-propyl, 2-butyl and 3-pentyl. In a preferred definition, alkyl has up to 16 C-atoms and more preferably up to 12 C-atoms.

Arylene is preferably phenylene or naphthylene, each of which is unsubstituted or substituted by lower alkyl or lower alkoxy, especially 1,3-phenylene, 1,4-phenylene or methyl-1,4-phenylene; 1,5-naphthylene or 1,8-naphthylene.

Aryl is a carbocyclic aromatic compound that is unsubstituted or substituted, preferably by lower alkyl or lower alkoxy. Examples are phenyl, toluyl, xylyl, methoxyphenyl, tert-butoxy-phenyl, naphthyl and phenanthryl.

A saturated bivalent cycloaliphatic group is preferably $C_3$–$C_8$cycloalkylene and in particular $C_5$–$C_7$cycloalkylene that is unsubstituted or substituted by one or more lower alkyl groups, for example cyclohexylene or trimethylcyclohexylene, or $C_3$–$C_8$cycloalkylene-lower alkylene and in particular $C_5$–$C_7$cycloalkylene-lower alkylene that is unsubstituted or substituted by one or more lower alkyl groups, for example cyclohexylenemethylene, trimethylcyclohexylenemethylene, or the bivalent isophorone radical.

Unless otherwise defined, within the context of the present invention the term "lower" used in connection with radicals and compounds denotes especially radicals or compounds having up to 8 carbon atoms, preferably up to 4 carbon atoms.

Consequently, lower alkyl has especially up to 8 carbon atoms, preferably up to 4 carbon atoms, and is, for example, methyl, ethyl, propyl, butyl, tert-butyl, pentyl, hexyl or isohexyl.

Alkylene has up to 20 carbon atoms and may be linear or branched. Suitable examples include decylene, octylene, hexylene, pentylene, butylene, propylene, ethylene, methylene, 2-propylene, 2-butylene and 3-pentylene.

Consequently, lower alkylene is alkylene having up to 8 carbon atoms and especially up to 4 carbon atoms. An especially preferred definition of lower alkylene is propylene, ethylene or methylene.

Accordingly, lower alkoxy has especially up to 8 carbon atoms, preferably up to 4 carbon atoms, and is, for example, methoxy, ethoxy, propoxy, butoxy, tert-butoxy or hexyloxy.

The arylene moiety of alkylenearylene or arylenealkylene is preferably phenylene that is unsubstituted or substituted by lower alkyl or by lower alkoxy and the alkylene moiety thereof is preferably lower alkylene, such as methylene or ethylene, especially methylene. Such radicals are therefore preferably phenylenemethylene or methylenephenylene.

Aminoalkyl maybe linear or branched and has up to 20 carbon atoms. Aminoalkyl is preferably amino lower alkyl and and has in particular up to 8 carbon atoms and more preferably up to 4 carbon atoms. Examples for aminoalkyl are aminomethyl, aminoethyl, aminopropyl, aminobutyl, aminohexyl, aminooctyl or aminodecyl.

Hydroxyalkyl maybe linear or branched and has up to 20 carbon atoms. Hydroxyalkyl is preferably hydroxy lower alkyl and has in particular up to 8 carbon atoms and more preferably up to 4 carbon atoms. Examples for hydroxyalkyl are hydroxymethyl, hydroxyethyl, hydroxypropyl, hydroxybutyl, hydroxyhexyl, hydroxyoctyl or hydroxydecyl.

Partially fluorinated alkyl is understood to be alkyl in which up to 90%, preferably up to 70%, and especially up to 50%, of the hydrogen atoms have been substituted by fluorine.

Arylenealkylenearylene is preferably phenylene-lower alkylenephenylene having up to 8 carbon atoms, and especially up to 4 carbon atoms, in the alkylene moiety, for example phenyleneethylenephenylene or phenylenemethylenephenylene.

Within the context of the present invention, a monosaccharide is understood to be an aldopentose, aldohexose, aldotetrose, ketopentose or ketohexose.

Examples of an aldopentose are D-ribose, D-arabinose, D-xylose and D-lyose; examples of an aldohexose are D-allose, D-altrose, D-glucose, D-mannose, D-gulose, D-idose, D-galactose, D-talose, L-fucose and L-rhamnose; examples of a ketopentose are D-ribulose and D-xylulose; examples of a tetrose are D-erythrose and threose; and examples of a ketohexose are D-psicose, D-fructose, D-sorbose and D-tagatose.

Examples of a disaccharide are trehalose, maltose, isomaltose, cellobiose, gentiobiose, saccharose, lactose, chitobiose, N,N-diacetylchitobiose, palatinose and sucrose.

Raffinose, panose and maltotriose may be mentioned as examples of a trisaccharide.

Examples of an oligosaccharide are maltotetraose, maltohexaose, chitoheptaose and also cyclic oligosaccharides, such as cyclodextrin.

Cyclodextrin contain from 6 to 8 identical units of α-1,4-glucose. Some examples are α, β- and γ-cyclodextrin, derivatives of such cyclodextrins, such as hydroxypropylcyclodextrins, and branched cyclodextrins which additionally carry on the ring lateral glucose and/or maltose radicals.

A saturated hydrocarbon is, for example, an alkane that may be linear, branched, mono-cyclic or polycyclic and preferably contains up to 40 carbon atoms, especially up to 30 carbon atoms. An example of a linear hydrocarbon is dodecane; an example of a branched hydrocarbon is 9,9-dinonyl-octadecane; an example of a monocyclic hydrocarbon is cyclohexane and an example of a polycyclic hydrocarbon is adamantane, norbornane or Decalin.

An alkane may be interrupted by one or more hetero atoms, in particular by O, N or S. An example of a branched alkane interrupted by an oxygen atom is dineopentyl ether, and an example of a cyclic alkane is tetrahydrofuran or dioxane.

A polyamide may be linear, branched or cyclic and is made up especially of bivalent —NHCO— or —CONH— groups which may be linked to one another via one or more carbonyl or NH group(s), the number of bivalent —NHCO— or —CONH— groups being from 2 to 6, preferably from 2 to 5, and especially from 2 to 4. An example of a cyclic polyamide is cyanuric acid, and an example of a linear polyamide is $H_2NCO—NHCONH_2$.

A carbocyclic aromatic radical is a mono- or poly-cyclic ring system having at least one aromatic ring and preferably up to 40 carbon atoms, especially up to 30 carbon atoms. Examples of a carbocyclic aromatic radical are benzene, naphthalene and Tetralin. A carbocyclic aromatic radical substituted by lower alkyl is, for example, toluene.

A heterocyclic aromatic radical is a mono- or poly-cyclic aromatic ring system having at least one hetero atom, such as N, O or S, and preferably up to 40 carbon atoms, especially up to 30 carbon atoms. Examples of a heterocyclic aromatic radical are pyridine, thiophene, indole or benzodiazepine. An aryl-substituted heterocyclic aromatic radical is, for example, 5-phenyl-1,4-benzodiazepine.

There is preferably used for a polymer according to the invention a macromer containing at least one section of formula (I)

$$-a-Z-b- \quad (I),$$

wherein
(a) is a polysiloxane segment containing at least one primary amino group or at least one hydroxy group,
(b) is a polyol segment containing at least 4 carbon atoms,
Z is a segment (c) or a group $X_1$,
a segment (c) being defined as $X_2—R—X_2$ wherein R is a bivalent radical of an organic compound having up to 20 carbon atoms and each $X_2$ independently of the other is a bivalent radical having at least one carbonyl group, and $X_1$ having the same definition as $X_2$; with the proviso that the polysiloxane segment (a) carries at least one partially fluorinated alkyl group.

Preference is given also to a macromer according to formula (III)

$$a\text{-}(X_1\text{-}b)_q \quad (III),$$

wherein the polysiloxane segment (a) has q pendant ligands (b),
segment (b) is derived from a carbohydrate lactone,
$X_1$ is as defined above, and
q has an average numerical value of from 1 to 20, preferably from 1 to 10 and especially from 1 to 5. The variables (a), (b) and (c) have the definitions and preferred definitions given hereinbefore.

Preference is given also to a macromer according to formula (IV)

$$-(a\text{-}X_1\text{-}b)_q\text{-} \quad (IV),$$

having a linear sequence wherein
a segment (b) is derived from a carbohydrate dilactone and
a segment (a) is derived from a polysiloxane of formula (I),
$X_1$ is as defined above, and
q has an average numerical value of from 1 to 20, preferably from 1 to 10 and especially from 1 to 5.

Further preference is given also to a macromer according to formula (V)

$$b\text{-}X_1\text{-}a\text{-}X_1\text{-}b \quad (V),$$

wherein
a polysiloxane segment (a) carries at least one partially fluorinated alkyl group,
a polyol (b) is derived from a carbohydrate monolactone, and
$X_1$ is as defined above.

In a preferred form, a macromer comprises a segment sequence of formula (VI)

$$b\text{-}Z\text{-}a\text{-}\{c\text{-}a\}_1\text{-}(Z\text{-}b)_t \quad (VI),$$

wherein
r is an integer from 1 to 10, preferably from 1 to 7 and especially from 1 to 3;
t is 0 or 1 and preferably 1;
a linear (c-a) chain is present that may be terminated by a segment (b) (t=1); and
a polysiloxane segment (a) carries at least one partially fluorinated alkyl group and the other variables have the non-limited definitions given hereinbefore.

A preferred form of the macromer comprises a segment sequence of formula (VII)

$$b\text{-}Z\text{-}a\text{-}\{c\text{-}a\text{-}(Z\text{-}b)_t\}_r \quad (VII),$$

wherein
the sequence (c-a)-(Z-b)$_t$ depends pendently from the segment (a) r times and may be terminated by a segment (b),
r is an integer from 1 to 10, preferably from 1 to 7 and especially from 1 to 3;
t is 0 or 1 and preferably 1;
Z is a segment (c) or a group $X_1$; and
a polysiloxane segment (a) carries at least one partially fluorinated alkyl group and the other variables have the non-limited definitions given hereinbefore.

A further preferred form of a macromer comprises a segment sequence of formula (VIII)

$$b\text{-}c\text{-}\{a\text{-}c\}_s\text{-}B \quad (VIII),$$

wherein
s is an integer from 1 to 10, preferably from 1 to 7 and especially from 1 to 3;
B is a segment (a) or (b); and
a polysiloxane segment (a) carries at least one partially fluorinated alkyl group and the other variables have the non-limited definitions given hereinbefore.

A further preferred form of a macromer comprises a segment sequence of formula (IX)

$$B\text{-}(c\text{-}b)_s\text{-}Z\text{-}a\text{-}(b)_t \quad (IX),$$

which contains linear structures and wherein
s is an integer from 1 to 10, preferably from 1 to 7 and especially from 1 to 3;
B is a segment (a) or (b); and
t is 0 or 1;
a segment (a) being derived from a polysiloxane of formula (I) and a segment (b) being as defined hereinbefore.

In a preferred polymer which are derived from a preferred macromer according to any of the above formula I and III–IX, the variables (a), (b), (c), $X_1$, $X_2$ and Z, independently of each other may have the more preferred definitions listed infra.

A polysiloxane segment (a) is derived from a compound of formula (II) wherein 95–29% of the radicals $R_1$, $R_2$, $R_3$, $R_4$, $R_5$ and $R_6$ are each independently of the others lower alkyl and 5–71% of the radicals $R_1$, $R_2$, $R_3$, $R_4$, $R_5$ and $R_6$ are each independently of the others partially fluorinated alkyl, aminoalkyl or hydroxyalkyl, and n is an integer from 10 to 250 and in particular from 12 to 125.

In a further preferred definition, the radicals $R_1$ and $R_6$ are a total of 1–2 times and especially 1.5 times, terminal amino-$C_1$–$C_4$alkyl or hydroxy-$C_1$–$C_4$alkyl, $R_2$, $R_3$, $R_4$ and $R_5$ being independently of each other $C_1$–$C_2$alkyl, and n is an integer from 12 to 125.

In a further preferred definition, the radicals $R_1$ and $R_6$ are a total of 1–2 times and especially 1.5 times, terminal amino-$C_1$–$C_4$alkyl or hydroxy-$C_1$–$C_4$alkyl, $R_2$, $R_3$, $R_4$ and $R_5$ being methyl, and n is an integer from 12 to 125.

When Z is $X_1$, $X_1$ is preferably an ester, amide, urethane or urea group, especially an ester or amide group.

$X_2$ has the same definition as $X_1$ and is in particular an amide, urethane or urea group.

When Z in formula (I) is $X_1$, a polyol segment (b) is preferably derived from gluconolactone, galactonolactone, lactobionolactone, maltoheptaonolactone, from glucuronic acid lactone, mannuronic acid lactone, iduronic acid lactone or from D-glucaro-1,4:6,3-dilactone.

A polyol segment (b) may be derived preferably from a polyol that does not carry a lactone group when the group Z is a segment (c) and is preferably derived from mannitol, glucitol, sorbitol, iditol, polyvinyl alcohol, an aminocyclodextrin, hydroxypropyl α-, β- or γ-cyclo-dextrin.

A segment (c) is $X_2$—R—$X_2$, wherein R is a bivalent radical of an organic compound having up to 25 carbon atoms and each $X_2$ independently of the other is an an amide, urethane or urea group.

In a further preferred definition the segment (c) is $X_2$—R—$X_2$, wherein R is alkylene or arylene having up to 12 carbon atoms, or a saturated bivalent cycloaliphatic group having from 6 to 14 carbon atoms and each $X_2$ independently of the other is an amide, urethane or urea group.

The mentioned macromers can be prepared by processes known per se, for example as follows.

In a first step, a polysiloxane containing at least one primary aminoalkyl group or one hydroxyalkyl group is reacted with a carbohydrate monolactone, forming an amide or ester bond; when q pendant aminoalkyl or hydroxyalkyl groups are present, a compound of formula (III) is formed and when terminal aminoalkyl or hydroxyalkyl groups are present, a compound of formula (V) is formed

a-($X_1$-b)$_q$ (III)

b-$X_1$-a-$X_1$-b (V), the variables being as defined hereinbefore.

A further process starts from a polysiloxane (a) containing terminal primary aminoalkyl or hydroxyalkyl groups which is reacted with a carbohydrate dilactone to form a linear structure of formula (IV)

-(a-$X_1$-b)$_q$- (IV), the variables having the definitions and preferred definitions given hereinbefore.

A further process starts from a polysiloxane (a) containing terminal primary aminoalkyl or hydroxyalkyl groups which is reacted first with a bifunctional compound of formula (X)

$X_4$—R—$X_4$ (X), wherein $X_4$ is a group that is coreactive with an amino or hydroxy group of segment (a) and there being formed from such a reaction an $X_2$ group of a segment (c);

$X_4$ is preferably —COOH, —COO$R_{10}$, —COCl or —NCO, wherein $R_{10}$ is alkyl or unsubstituted or lower alkyl- or lower alkoxy-substituted aryl, and R is as defined above;

that intermediate is then reacted with a polyol that does not carry a lactone group to form a compound of formula (VIII)

b-c-{a-c}$_s$-B (VIII), the variables having the definitions and the preferred definitions described hereinbefore.

A further process starts from a bifunctional compound of formula (X)

$X_4$—R—$X_4$ (X), which is reacted with an excess of polysiloxane (a) containing preferably two amino groups to form a -a-(c-a)$_r$ sequence wherein the above definitions apply, and in a second step is reacted with a polyol that carries a lactone to form a compound of formula (VI)

b-Z-a-{c-a}$_1$-(Z-b)$_t$ (VI)

wherein r is an integer from 1 to 10, preferably from 1 to 7 and especially from 1 to 3, the variables having the definitions given hereinbefore.

A siloxane (a) containing at least one primary aminoalkyl group and, in some cases, at least one hydroxyalkyl group is, for example, commercially available. Examples are KF-6002, KF-8003, X-22-161C (Shin Etsu) or GP4 (Genesee). Other siloxanes can be synthesised using published procedures.

A polyol (b) required for the synthesis is generally commercially available. Examples are gluconolactone or lactobionolactone. Otherwise they can be synthesised using a published procedure.

The mentioned macromers can be prepared in the presence or absence of a solvent. Advantageously, a solvent is used that is substantially inert, i.e. that does not take part in the reaction. Suitable examples are ethers, such as tetrahydrofuran (THF), 1,2-dimethoxyethane, diethylene glycol dimethyl ether or dioxane, halogenated hydrocarbons, such as chloroform or methylene chloride, bipolar aprotic solvents, such as acetonitrile, acetone, cyclohexanone, dimethylformamide (DMF) or dimethyl sulfoxide (DMSO), hydrocarbons, such as toluene or xylene, also pyridine or N-methylmorpholine.

In the preparation of the mentioned macromers, the reactants are advantageously used in stoichiometric amounts. The reaction temperature may be, for example, from −30° C. to 150° C. The range from 0° C. to 40° C. is a preferred temperature range. The reaction times are in the range of approximately from 15 minutes to 7 days, preferably in the range of approximately from 6 to 12 hours. If necessary, the reactions are carried out under argon or nitrogen as protective gas. In urethane-forming reactions it is advantageous to add a suitable catalyst, such as dibutyltin dilaurate (DBTDL), 1,4-diazabicyclo[2.2.2]octane (DABCO), a long-chained fatty acid salt or 4-dimethylaminopyridine (DMAP).

A preferred composition of a polymer according to the invention is as follows: the content by weight of a macromer mentioned hereinbefore relative to the total polymer is in the range from 99 to 5%, especially in the range from 95 to 50% and very especially in the range from 90 to 70%, the balance to 100% by weight being formed by at least one above-mentioned di- or tri-isocyanate.

The invention relates also to a process for the preparation of a polymer according to the invention, which process comprises mixing a macromer containing at least one section of formula (I)

$$-a-Z-b- \qquad (I),$$

wherein
- (a) is a polysiloxane segment containing at least one primary amino group or at least one hydroxy group,
- (b) is a polyol segment containing at least 4 carbon atoms,
- Z is a segment (c) or a group $X_1$, segment (c) being defined as $X_2$—R—$X_2$ wherein R is a bivalent radical of an organic compound having up to 20 carbon atoms, and each $X_2$ independently of the other is a bivalent radical having at least one carbonyl group, and $X_1$ having the same definition as $X_2$;
- with a polyisocyanate in the presence or absence of a solvent, if necessary adding a suitable catalyst and then, if necessary, heating the reaction mixture.

An addressed polymerization of a macromer containing at least one section of formula (I) with a polyisocyanate, means that a mixture of one or more macromers and/or of one or more polyisocyanates is suitable in the manufacture of a corresponding polymer too. Consequently, the terms a macromer or a polyisocyanate should be construed in a non-limiting fashion with respect to an addressed species.

Suitable solvents are in principle any solvents that dissolve the components used, for example carboxylic acid amides, such as dimethylformamide, dipolar aprotic solvents, such as dimethyl sulfoxide or methyl ethyl ketone, ketones, such as acetone or cyclohexanone, hydrocarbons, such as toluene or xylene, ethers, such as THF, dimethoxyethane or dioxane, halogenated hydrocarbons, such as trichloroethane, and also mixtures of suitable solvents.

The reaction of a macromer mentioned above with a polyisocyanate is advantageously carried out in the presence of a suitable catalyst. A suitable catalyst may already have been used in the preparation of the macromer described above and the addition of a further catalyst is therefore only optional. Such a catalyst is suitable especially for facilitating the formation of a urethane and is, for example, dibutyltin dilaurate (DBTDL), 1,4-diazabicyclo-[2.2.2]octane (DABCO), a long-chained fatty acid salt or 4-dimethylaminopyridine (DMAP).

The reaction of a macromer mentioned above with a polyisocyanate generally takes place in several steps and especially in two steps, as follows: firstly, typically a chain-extension reaction and, secondly, generally a network-forming or crosslinking reaction.

Chain-extension is effected, for example, by reacting two isocyanate groups of a triisocyanate with a siloxane polyol, primary hydroxy groups generally reacting before secondary hydroxy groups (where present). The reactivity of a terminal OCN group at growing chain ends typically diminishes constantly, with the result that relatively short chains are usually formed at first. Branches of a chain generally occur when, from a stoichiometric point of view, a siloxane-polyol substrate, for example according to formula (I) above, reacts with more than one polyisocyanate molecule, for example via the secondary OH groups of the polyol segment.

In a first step, the addition of a polyisocyanate to a macromer preferably involves only one of its isocyanato groups. The reaction rate of a polyisocyanate with a second, and in some cases a third, isocyanate group is usually markedly slower, with the result that the reaction products can, if desired, be isolated after the first reaction step in the form of so-called prepolymers, the prepolymers typically still containing free isocyanate groups. That effect is especially pronounced when the polyisocyanate used has isocyanato groups having different reactivities. Polyisocyanates having different reactivities are therefore generally preferred.

Different reactivities usually exist when the spatial conditions in the vicinity of an isocyanate group are such that steric hindrance occurs. In addition to pure steric hindrance, electronic effects (electron-attracting or electron-repelling structural features within a polyisocyanate molecule) control the reactivity of an individual isocyanate group.

If the above-mentioned prepolymers are not isolated, the reaction is allowed to proceed typically until the polymer is completely crosslinked, the reaction in the second step (the crosslinking step) generally being carried out at elevated temperature and, if necessary, with the addition of a catalyst. The crosslinking is carried out, for example, by reacting terminal or pendant isocyanate groups (or any excess polyisocyanate still remaining) in the primary addition product, for example, with any free OH groups likewise still present therein (e.g. preferably secondary OH groups). When the composition and the reaction procedure are optimum, the crosslinked polymer thus produced no longer contains any free OCN groups.

The present invention thus relates also to a prepolymer containing at least one free isocyanato group, consisting of the addition product of a macromer containing at least one section of formula (I)

$$-a-Z-b- \qquad (I),$$

wherein
- (a) is a polysiloxane segment containing at least one amino group,
- (b) is a polyol segment containing at least 4 carbon atoms,
- Z is a segment (c) or a group $X_1$,
- segment (c) being defined as $X_2$—R—$X_2$ wherein R is a bivalent radical of an organic compound having up to 20 carbon atoms and each $X_2$ independently of the other is a bivalent radical having at least one carbonyl group, and $X_1$ having the same definition as $X_2$; and a polyisocyanate.

The variables have the same definitions and preferred definitions as those mentioned in connection with a polymer according to the invention.

The invention relates also to a process for the preparation of a prepolymer, which process comprises adding to a macromer as defined hereinbefore, a polyisocyanate, preferably a polyisocyanate wherein the isocyanate groups have different reactivities, and especially a diisocyanate wherein the isocyanate groups have different reactivities, in the presence or absence of a solvent. If it is advantageous, a catalyst is added.

If necessary after being freed of solvent, a prepolymer according to the invention can, for example, be thermoplastically pressed in suitable moulds and crosslinked either simultaneously or subsequently at elevated pressure (thermocuring, hot-pressing) to form a polymer mentioned hereinbefore or hereinafter. A variety of moulded articles, especially contact lenses, can likewise be produced in that manner.

The present invention therefore relates also to a process for the preparation of a polymer, which process comprises crosslinking a prepolymer according to the invention by suitable means.

By "suitable means" there is to be understood in the present case, for example, an increase in pressure or in temperature (relative to normal conditions) or both.

The matrix of a (crosslinked) polymer according to the invention typically has a special morphology which is the result of microphase separation of the hydrophobic siloxane segments and the hydrophilic polyol segments. The so-called thermal transitions between the two interpenetrating microphases can be detected by DSC (differential scanning calorimetry or differential thermoanalysis). The dimensions of the two microphases are characteristically of such an order of magnitude that there is no significant light scatter (light-optical properties are fully retained).

A further feature of the polymers according to the invention is that the crosslinking sites are present only within the polyol phase and preferably in the peripheral zones of the polyol phase, whereas the chains of the polysiloxane microphase are highly mobile. In addition to covalent crosslinking, as already mentioned in the introduction there is physical, reversible crosslinking in a polymer material, resulting, for example, from polar interactions and especially from hydrogen bridges, for example between OH groups and urethane groups. Water stored in the hydrophilic microphase participates in the formation of hydrogen bridges. It has a very advantageous effect on the mechanical softness, the flexibility, the expansion capacity, the tensile strength and the mechanical damping capacity of the polymers.

The mentioned special structural characteristics of the polymers according to the invention result in extremely advantageous properties. For example, contact lenses made from polymers according to the invention exhibit a great deal of wearing comfort and extremely high permeability to oxygen. Other advantages, preparation processes and uses are mentioned explicitly below.

The polymers according to the invention can be processed in a manner known per se to form moulded articles, especially to form contact lenses, for example by carrying out the step of crosslinking a macromer mentioned hereinbefore with a polyisocyanate or of crosslinking a prepolymer directly in a suitable contact lens mould. The invention therefore relates also to moulded articles consisting essentially of a polymer according to the invention. Other examples of moulded articles according to the invention, in addition to contact lenses, are biomedical articles or special ophthalmic moulded articles, for example artificial corneas, intraocular lenses, eye dressings, moulded articles for use in surgery, such as heart valves, artificial arteries or the like, also coatings for etching resists or screen printing resists, and particles, especially microparticles, capsules, especially microcapsules, films and plasters for drug delivery systems.

A special embodiment of the invention relates to contact lenses that comprise a polymer according to the invention or that consist essentially or entirely of a polymer according to the invention. Such contact lenses have a wide range of unusual and extremely advantageous properties. Among those properties, mention may be made, for example, of their excellent compatibility with the human cornea (if necessary after suitable surface treatment (coating)) and with lachrymal fluid, which is based on a balanced ratio of water content, oxygen permeability and mechanical and adsorptive properties. Those properties result in a high degree of comfort and in the absence of irritating and allergenic effects. Owing to their advantageous permeability characteristics in respect of various salts, nutrients, water and a variety of other components of lachrymal fluid and gases ($CO_2$, $O_2$), contact lenses according to the invention do not impair, or impair only to an insignificant extent, the natural metabolic processes in the cornea. In contrast to many other siloxane-containing contact lenses, for example, hydrophilic lenses containing a polymer according to the invention do not exhibit the frightening suction-cap effect. Contact lenses according to the invention are especially suitable for wearing over prolonged periods (extended wear). Moreover, the contact lenses according to the invention have a high degree of dimensional stability and storage stability.

Surface treatment as is referred to herein, in particular refers to a process to render a surface more bio-compatible, whereby, by means of contact with a vapor or liquid, and/or by means of application of an energy source (a) a coating is applied to the surface to an article, (b) chemical species are adsorbed onto the surface of an article, (c) the chemical nature (e.g. electrostatic charge) of chemical groups on the surface of an article are altered, or (d) the surface properties of an article are otherwise modified.

There are a variety of methods disclosed in the art for rendering a surface of a material hydrophilic. For example, a molding may be coated with a layer of a hydrophilic polymeric material. Alternatively, hydrophilic groups may be grafted onto the surface of a molding, thereby producing a monolayer of hydrophilic material. These coating or grafting processes may be effected by a number of processes, including without limitation thereto, exposing the molding to plasma gas or immersing the lens in a monomeric solution under appropriate conditions.

Another set of methods of altering the surface properties of an article or a molding involves treatment prior to polymerization to form said article or molding. For example, a molding may be treated with plasma (i.e. an ionized gas), a static electrical charge, irradiation, or other energy source, thereby causing the prepolymerization mixture immediately adjacent the molding surface to differ in composition from the core of the prepolymerization mixture.

A preferred class of surface treatment processes are plasma processes, in which an ionized gas is applied to the surface of an article. Plasma gases and processing conditions are described more fully in U.S. Pat. No. 4,312,575 and U.S. Pat. No. 4,632,844, which are incorporated herein by reference. The plasma gas is preferably a mixture of lower alkanes and nitrogen, oxygen or an inert gas.

In a more preferred embodiment, a mold or a molded article, as described hereinbefore or hereinafter, is plasma treated in the presence of a mixture of (a) a $C_1$–$C_6$alkane and (b) a gas selected from the group consisting of nitrogen, argon, oxygen, and mixtures thereof. A $C_1$–$C_6$alkane (a) is preferably selected from a $C_1$–$C_4$alkane and may for example be methane, propane or butane. A gas (b) is preferably selected from nitrogen, oxygen and a mixture thereof and in particular from air, wherein air within the meaning of the present invention denotes 79% nitrogen and 21% oxygen. In a more preferred embodiment, a molding is plasma treated in the presence of a mixture of methane and air. Likewise, said preferred embodiment relates not only to a mold but also to a contact lens.

The plasma treatment (apparatus and process) as is referred to hereinbefore and hereinafter is preferably carried out in analogy to the disclosure of H. Yasuda, "Plasma Polymerization", Academic Press, Orlando, Fla. (1985), pages 319 forward.

The present invention relates also to contact lenses consisting essentially of one of the polymers according to the invention, those contact lenses being soft contact lenses containing from 1 to 40% water.

The present invention relates also to contact lenses consisting essentially of one of the polymers according to the invention, those contact lenses being low water content, rigid, gas permeable (RGP) contact lenses, and hybrid lenses.

Of course, all of the advantages mentioned hereinbefore apply not only in the case of contact lenses but also in the case of other moulded articles according to the invention.

The present invention relates also to the use of a polymer or prepolymer according to the invention for coating a base material, such as glass, ceramics or metal, and preferably polymer substrates, such as products for ophthalmic use, such as contact lenses, intra-ocular lenses or eye dressings, and products for medical use, for example products for use in surgical or pharmaceutical systems, hydrophilic coatings being preferred in the first-mentioned cases (ophthalmic uses).

There are understood by polymer substrates especially substrates made from materials typically used for ophthalmological lenses, especially contact lenses. Suitable polymer substrates are, for example, RGP lenses (Rigid Gas Permeable), for example Nefocon A (Ocusil), Pasifocon A (Paraperm-02), Telefocon B (SGP-II), Silafocon A (Polycon-2), Fluorsilfocon (Fluorex-400), Paflufocon A (Fluoroperm-30) or Silafocon B (Polycon-HDK); also suitable are amorphous Teflon substrates or contact lenses made therefrom, for example those made from Teflon AF 1600 or Teflon AF 2400, the former being a copolymer of 63–73 mol % perfluoro-2,2-dimethyl-1,3-dioxole and 37–27 mol % tetrafluoroethylene and the latter a copolymer of 80–90 mol % perfluoro-2,2-dimethyl-1,3-dioxole and 20–10 mol % tetrafluoroethylene. Polymer substrates containing polysiloxanes are especially suitable.

The coating of a mentioned base material is generally carried out using a method known to a person skilled in the art. A polymer or prepolymer according to the invention is, for example, covalently bonded to the surface of an article via reactive groups. If the material to be coated does not have any suitable reactive groups on its surface, it is first treated, for example, with a suitable plasma, during which treatment suitable reactive groups are incorporated into the surface of the said base material. Those groups can then be derivatised, for example with a difunctional radical (for example a diisocyanate) which is then capable of forming a covalent bond with a polymer according to the invention.

Suitable reactive groups are, for example, hydroxy, amino, carboxy, carbonyl, sulfonyl, sulfonyl chloride or halogens, such as bromine or iodine. Preferred reactive groups are hydroxy and amino. A method of applying reactive groups, such as hydroxy or amino, to the surface of an article via plasma surface treatment has been published in the relevant literature. WO 89/00220 (Griesser et al.) may be mentioned here by way of example.

In order that a polymer or prepolymer according to the invention can be grafted to the surface of an article, as already mentioned hereinbefore the surface of the article must first be derivatised. That is advantageously carried out, for example, with a difunctional radical the functional groups of which are coreactive with the reactive groups (for example hydroxy or amino groups) of the surface of the article and the reactive groups (for example hydroxy groups, isocyanato groups) of a polymer or prepolymer according to the invention. The functional groups of the difunctional radical are preferably isocyanates and the radical is preferably selected from lower alkylene, arylene, a saturated bivalent cycloaliphatic group having from 6 to 20 carbon atoms, alkylenearylene, arylenealkylene and arylenealkylene-arylene.

The polymers according to the invention are also suitable for use as corneal implants or as artificial corneas; also as cell-growth substrates, as materials for securing and culturing animal cells in vitro and in viva, as medical implants, such as implantable semi-permeable membrane materials, as tissue implants for cosmetic surgery, as implants containing hormone-secreting cells, such as Langerhans' cells, as breast implants or as artifical joints and the like.

The present invention therefore relates also to a corneal implant prepared from a polymer described hereinbefore. A mentioned corneal implant can be prepared using the same process as that described hereinbefore for the preparation of contact lenses. Corneal implants can be implanted using conventional surgical methods, for example under, in or through the epithelial tissue of the cornea or into the stromata of the cornea or into other tissue layers of the cornea. Such implants are capable of altering the optical properties of the cornea, for example by correcting a visual deficit and/or by altering the appearance of the eye, such as the colour of the pupil. A corneal implant may include the area over the optical axis; when implanted, such an implant covers the pupil and imparts vision; and also the area surrounding the periphery of the optical axis. The implant may have the same visual properties over the entire area.

It has been found that the passage of high-molecular-weight components of tissue fluid, for example proteins or glycoproteins, such as growth factors, peptides, hormones or proteins that are responsible for transporting essential metal ions, through a corneal implant, especially between epithelial cells and stroma cells and even behind the endothelial layer, is important both for the survival of tissue and for the viability of tissue outside and within a corneal implant. It is therefore preferable to produce a corneal implant having a porosity that is sufficient to allow the passage of components of tissue fluid having a molecular weight of >100 000 dalton, which ensures the passage of components of tissue fluid as well as the passage of low-molecular-weight nutrient components or metabolites, such as glucose, lipids or amino acids, or respiratory gases, between cells on both sides of an implant.

The porosity of a corneal implant is either inherent in the polymer material from which it is made, or else pores can additionally be incorporated into a polymer according to the invention, namely by means of one of the numerous known procedures described, for example, in WO 90/07575, WO 91/07687, U.S. Pat. No. 5,244,799, U.S. Pat. No. 5,238,613, U.S. Pat. No. 4,799,931 or U.S. Pat. No. 5,213,721.

Irrespective of the method by which the requisite porosity of an implant according to the invention is produced, an implant preferably has a porosity that is sufficient to allow the passage of proteins and other biological macromolecules having a molecular weight up to or greater than 10 000 dalton, such as macromolecules having a molecular weight of from 10 000 to 1 000 000 dalton, but that is not so great that entire cells are able to pass through and enter the area over the optical axis of the implant. Where the permeability of the implant is provided by means of pores, the area over the optical axis contains a plurality of pores, the number of which is not to be limited, but should be sufficient to allow the free passage of tissue components between the outer and the inner areas of an implant. The pores that are positioned over the area of the optical axis preferably do not cause any scatter of visible light to an extent that would cause problems with regard to the correction of vision (no impairment of the optical clarity of the material). By the term "pore" there is to be understood hereinbefore and hereinafter a pore that has no geometric limitations and may have a regular but also an irregular morphology. The indication of a pore size does not mean that all pores have the same diameter. It is, rather, an average diameter.

In the area outside the optical axis, the corneal implant may have the same porosity as it does inside the area over the optical axis. The peripheral area of an implant that surrounds the area over the optical axis is also referred to as the "skirt" and, in contrast to the area of the optical axis, can allow the growth of corneal cells, which anchors the implant to the eye.

The porosity in the skirt may also be an independent feature of the material from which the skirt is made. If the skirt is made from the same material as the material over the optical axis, pores of different diameters can be made in the skirt and over the optical axis. On the other hand, the skirt may be made from a material that is different from the material over the optical axis, in which case, as described above, the porosity of the skirt should be greater than that over the optical axis. A skirt consists preferably of a polymer that is optically clear, like a polymer over the optical axis; the skirt can, however, consist of a material that is not optically clear, or it is prepared from a porous material that is not optically clear.

A polymer according to the invention can be used to assist in colonisation by tissue cells, such as vascular endothelial cells, fibroplasts or cells formed in bones; no specific type of surface is needed to stimulate cell adhesion and cell growth. That is advantageous, since it means that the cost of the process can be kept low. On the other hand, the surface of a polymer according to the invention can be modified using a known technique, such as plasma treatment of the surface by means of radio frequency glow discharge, for example as described in U.S. Pat. No. 4,919,659 or in WO 89/00220, or by irradiation or chemical treatment.

The surface of a polymer according to the invention can be coated with one or more components, in order, for example, to promote the growth of tissue. Such materials are, for example, fibronectin, chondroitin sulfate, collagen, laminin, cell-adhesion proteins, globulin, chondronectin, epidermal growth factors, muscle-fibre proteins, and/or derivatives thereof, active fragments and mixtures thereof. Fibronectin, epidermal growth factors and/or their derivatives, active fragments and mixtures thereof are especially useful. Such surface coating can, if necessary, also be carried out after a surface modification as described hereinbefore. A polymer according to the invention can advantageously combine several of the mentioned properties, such as the adhesion of cells with good biostability and resistance to deposits.

The mechanical properties of a polymer according to the invention make it suitable for use as a corneal implant, the material preferably having a modulus of elasticity of 0.5–10 MPa. A modulus of elasticity of that level imparts to a corneal implant a flexibility that makes it suitable for insertion into the eye, for example over the area of Bowman's membrane.

A polymer according to the invention can be used, furthermore, as a cell-growth substrate, for example as cell-culture equipment, for example as vessels, flasks, dishes and the like, also in biological reactors, for example in the production of valuable proteins and other cell-culture components.

The Examples that follow serve further to illustrate the present invention; they are not, however, intended to limit the scope thereof in any way. Temperatures are given in degrees Celsius.

EXAMPLE A1

2.5 ml of absolute toluene, and then 0.86 g (4.6 mmol) of allyl phthalimide, are added to 10 g of poly (dimethylsiloxane-co-methylhydrosiloxane) [Bayer Silopren U-230; 10 000 g/mol; 2.3 mmol of Si—H/g]. The mixture is degassed several times and then the flask containing said mixture is flushed with argon. 0.5 ml of a 0.005 molar solution of Lamoreaux catalyst in absolute toluene (100 ppm Pt/mol Si—H) is added and the mixture is heated at 80° C. After a reaction time of one hour, a colourless, clear to slightly cloudy solution is obtained, the $^1$H-NMR spectrum of which no longer has resonances of allyl hydrogen atoms.

Then 7.28 g (18 mmol) of degassed allyl-1H,1H,2H,2H-perfluorooctyl ether are added slowly and the reaction mixture is stirred for 3 hours at 80° C. After the addition reaction, the $^1$H-NMR spectrum shows a much weaker resonance of the Si—H function at 4.6 ppm and a strong resonance at 0.5 ppm, orginating from Si—$CH_2$ hydrogen atoms. Allyl resonances are no longer visible, but instead weak resonances that cannot be integrated by the NMR apparatus and that are attributed to the perfluoroalkyl-substituted propenyl ether, a rearrangement product of the allyl ether that is not reactive in hydrosilylation reactions, which is formed as secondary product.

Then 1.0 g (38.4 mmol) of 1-hexene is added in order to react the remaining excess of Si—H groups which might otherwise cause crosslinking of the polymer later when air is admitted, and the reaction mixture is stirred for a further one hour at 80° C.

The macromer solution is then left to stand overnight. The product is purified over a silica gel column with hexane/ethyl acetate (3:2), the solvent is removed and the macromer is dried under a high vacuum. A colourless, clear, viscous product is obtained.

The macromer is taken up in 20 ml of hexane; 20 ml of methylamine [33% in ethanol] are added and the reaction mixture is heated at 40° C. After 10 to 15 minutes a white bulky precipitate separates out. After 30 minutes the suspension is cooled and filtered and the precipitate is washed with a small amount of hexane. In vacuo, the methylamine is removed from the filtrate. Then the macromer is dried under a high vacuum and the amino group content is then determined by titration.

The resulting macromer is colourless, dear and viscous. The amino group content is 80% of the theoretical yield. The total yield of macromer after purification by chromatography is 55%.

EXAMPLES A2 to A4

The procedure described in Example A1 is repeated using the same concentration (100 ppm/Si—H) of other hydrosilylation catalysts (see Table 1).

TABLE 1

| Example | Catalyst | Origin | Amino group content | Conversion |
| --- | --- | --- | --- | --- |
| A1 | Lamoreaux cat. [0.005 molar in toluene] | according to US 3 220 972 | 80% | 100% |
| A2 | Pt(O)-divinyltetramethyl disiloxane [0.005 molar in xylene] | Petrarch PC-072 | — | 100% |
| A3 | bis-benzonitrile-Pt(II) chloride [0.005 molar in THF] | Aldrich 27 581-6 | — | 100% |
| A4 | carbonyl-tris-(triphenylphosphine)-Rh(1) hydride | Aldrich 22 566-5 | — | 85% |

EXAMPLES A5 to A8

The procedure described in Example A1 is repeated using other Si—H functional starting polymers. The concentration of reactive groups is from 1.12 m.equiv/g of polymer to 16.2 m.equiv/g of polymer (see Table 2).

TABLE 2

| Example | Starting polymer Supplier | m. equiv SiH/g | Molar mass | Hydrosilylation catalyst | Conversion |
| --- | --- | --- | --- | --- | --- |
| A5 | Petrarch PS-123.5 | 1.12 | 2000–2500 | Pt(O)-divinyl disiloxane | 100% |
| A6 | Petrarch PS-122 | 16.20 | 4500–5000 | Pt(O)-divinyl disiloxane | — |
| A7 | Bayer U-430 | 4.30 | 5000 | Lamoreaux | 100% |
| A8 | Wacker V-525 | 4.70 | 12 000 | Lamoreaux | >95% |
| A1 | Bayer U-230 | 2.30 | 10 000 | Lamoreaux | 100% |

EXAMPLE A9

The procedure described in Example A1 is carried out using N-9-decenyl phthalimide instead of N-allyl phthalimide as protected olefinic amine.

4.0 ml of absolute xylene, and then 3.42 g of N-9-decenyl phthalimide (=12 mmol), are added to 20 g of poly (dimethylsiloxane-co-methylhydrosiloxane) (Bayer Silopren U-230; M=10 000 g/mol); 2.3 mmol of SiH/g;=10 mmol).

The mixture is degassed several times and the flask is flushed with argon. 0.92 ml of a 0.005 molar solution of Lamoreaux catalyst in absolute toluene (100 ppm Pt/mol Si—H) is added and the mixture is heated at 80° C. After a reaction time of one hour, a colourless clear solution is obtained, the $^1$H-NMR spectrum of which no longer has any resonances of allyl hydrogen atoms.

Then 4.85 g of degassed allyl-1H,1H,2H,2H-perfluorooctyl ether (=12 mmol) are added and the reaction mixture is stirred for 3 hours at 80° C. After the addition reaction, a $^1$H-NMR spectrum shows a much weaker resonance of the Si—H function at 4.6 ppm and a strong resonance at 0.5 ppm, originating from Si—CH$_2$ hydrogen atoms. Allyl resonances are no longer visible, but instead weak resonances that cannot be integrated by the NMR apparatus and that are attributed to the perfluoroalkyl-substituted propenyl ether, a rearrangement product of the allyl ether that is not reactive in hydrosilylation reactions, which is formed as secondary product.

Then 7.40 g of 1-hexene (=88 mmol) are added in order to react the remaining excess of Si—H groups which might otherwise cause crosslinking of the polymer later when air is admitted, and the reaction mixture is stirred for a further one hour at 80° C. The macromer solution is then left to stand overnight. The product is purified over a silica gel column with hexane/ethyl acetate (3:2), the solvent is removed and the macromer is dried under a high vacuum. A colourless, clear, viscous product is obtained. 5.0 g of macromer are taken up in 5 ml of hexane, and 5 ml of methylamine [33% in ethanol] are added and the reaction mixture is heated at 40° C. After from 10 to 15 minutes, a white bulky precipitate separates out. After 30 minutes the suspension is cooled and filtered and the precipitate is washed with a small amount of hexane. In vacuo, the methylamine is removed from the filtrate. Then the macromer is dried under a high vacuum and the amino group content is then determined by titration. The yield is 82% of the theoretical yield. The resulting macromer is colourless, clear and viscous.

EXAMPLE A10

The procedure described in Example A1 is carried out using benzyl-N-allyl carbamate instead of N-allyl phthalimide as protected olefinic amine.

2.0 ml of absolute toluene, and then 5.28 g (27.6 mmol) of benzyl allyl carbamate [CAS-Reg.No. 5041-33-8], are added to 30 g of poly(dimethylsiloxane-co-methylhydrosiloxane) [Bayer Silopren U-230; 10 000 g/mol; 2.3 mmol of Si—H/g]. The mixture is degassed several times and the flask is flushed with argon. 1.4 ml of a 0.005 molar solution of bis-benzonitrile-Pt(II) chloride in absolute tetrahydrofuran (100 ppm Pt/mol Si—H) are added and the mixture is heated at 80° C. After a reaction time of one hour, a colourless, clear to slightly cloudy solution is obtained, the $^1$H-NMR spectrum of which no longer has any resonances of allyl hydrogen atoms.

Then 12.4 g (30.6 mmol) of degassed allyl-1H,1H,2H, 2H-perfluorooctyl ether are added slowly and the reaction mixture is stirred for 3 hours at 80° C. After the addition reaction, a $^1$H-NMR spectrum shows a much weaker resonance of the Si—H function at 4.6 ppm and a strong resonance at 0.5 ppm, originating from Si—CH$_2$ hydrogen atoms. Allyl resonances are no longer visible, but instead weak resonances that cannot be integrated by the NMR apparatus and that are attributed to the perfluoroalkyl-substituted propenyl ether, a rearrangement product of the allyl ether that is not reactive in hydrosilylation reactions, which is formed as secondary product.

Then 1.0 g (38.4 mmol) of 1-hexene are added in order to react the remaining excess of Si—H groups which might otherwise cause crosslinking of the polymer later when air is admitted, and the reaction mixture is stirred for a further one hour at 80° C.

The benzyl carbamate groups are then removed by catalytic hydrogenation and as a result aminopropyl side groups are produced on the macromer backbone. For that purpose, 5.0 g of the benzyl-carbamate-protected starting material are dissolved in 50 ml of toluene and introduced into an autoclave. 0.5 g of Pd/C hydrogenation catalyst of the type NN/D is first prehydrogenated separately and then added to the macromer solution. The autoclave is heated at 110° C. and pressurised with 100 bar of hydrogen atmosphere. After 24 hours the autoclave is cooled to room temperature and the excess pressure is flushed. The product is separated from the hydrogenation catalyst by filtration and the solvent is removed. The amino group content determined by base titration is 45% of the theoretical yield.

EXAMPLE A11

The procedure described in Example A1 is carried out using allyl-1H,1H,3H-perfluoropropyl ether instead of allyl-1H,1H,2H,2H-perfluorooctyl ether as fluoroalkyl-substituted olefin. 3.0 ml of absolute toluene, and then 2.02 g (10.76 mmol) of allyl phthalimide, are added to 15 g of poly(dimethylsiloxane-co-methylhydrosiloxane) [Bayer Silopren U-230; 10 000 g/mol; 2.3 mmol of Si—H/g]. The mixture is degassed several times and the flask is flushed with argon. 0.7 ml of a 0.005 molar solution of Lamoreaux catalyst in absolute toluene (100 ppm Pt/mol Si—H) is added and the mixture is heated at 80° C. After a reaction time of one hour, a colourless clear solution is obtained, the $^1$H-NMR spectrum of which no longer has any resonances of allyl hydrogen atoms.

Then 2.63 g (15.3 mmol) of degassed allyl-1H,1H,3H-perfluoropropyl ether are added slowly and the reaction mixture is stirred for 3 hours at 80° C. After the addition reaction, a $^1$H-NMR spectrum shows a much weaker resonance of the Si—H function at 4.6 ppm and a strong resonance at 0.5 ppm, originating from Si—CH$_2$ hydrogen atoms. Allyl resonances are no longer visible, but instead weak resonances that cannot be integrated by the NMR apparatus and that are attributed to the perfluoroalkyl-substituted propenyl ether, a rearrangement product of the allyl ether that is not reactive in hydrosilylation reactions, which is formed as secondary product.

Then 1.0 g (38.4 mmol) of 1-hexene is added in order to react the remaining excess of Si—H groups which might otherwise cause crosslinking of the siloxane later when air is admitted, and the reaction mixture is stirred for a further one hour at 80° C.

EXAMPLES A12–A17

Further polydimethylsiloxanes are prepared analogously to Example A1. Table 3 shows the limits within which the composition of the functional substituents ([A], [B] and [C] in the Table) on the polydimethylsiloxane main chain varies.

Substitution of the Si—H functions by [A], [B] and [C]. The starting material is Bayer Silopren U-230 (M=10 000 g/mol/22.5 m.equiv SiH/g). 100 ppm of Lamoreaux catalyst are used per mmol of Si—H.

Those aminopropyl-substituted intermediates are unstable and have a tendency to cross-link. For that reason the subsequent stage is synthesised immediately.

B. Preparation of siloxane-polyol macromers

EXAMPLE B1

Preparation of

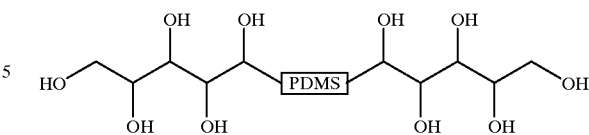

PDMS=polydimethylsiloxane

Reaction of an α,ω-bis-aminopropyl-dimethylpolysiloxane with D(+)gluconic acid δ-lactone Before the reaction, the amino-functionalised polydimethylsiloxane (X-22-161-C, Shin Etsu, JP) used for the synthesis is finely dispersed in acetonitrile, extracted and then subjected to short way distillation in order to remove low-molecular-weight and cyclic siloxanes. The subsequent reactions are carried out with the exclusion of H$_2$O. 200 g of purified amino-functionalised polydimethylsiloxane (0.375 m.equiv NH$_2$/g; M$_n$(VPO) 3400–3900 (VPO: Vapor Pressure Osmometry) dissolved in 200 ml of absolute THF are slowly added dropwise to a suspension of 13.35 g (75 mmol) of D(+)gluconic acid δ-lactone in 50 ml of absolute THF and the reaction mixture is then stirred for approximately 24 hours at 40° C. until the lactone has reacted fully. (Reaction monitoring by means of thin-layer chromatography (TLC): silica gel; isopropanol/H$_2$O/ethyl acetate 6:3:1; staining with Ce(IV) sulfate/phosphomolybdic acid solution (CPS reagent).) After the reaction, the reaction solution is concentrated to dryness and the residue is dried for 48 hours at 3 Pa (0.03 mbar). 213.3 g of α,ω-bis(3-gluconamidopropyl)polydimethylsiloxane are obtained. Amino group titration with perchloric acid produces over 99.8% conversion of the amino groups. The macromer contains 7.1% by weight carbohydrate.

EXAMPLE B2

Analogously to Example B1, 200 g (0.1315 equiv NH$_2$) of 3-aminopropyl-substituted poly-dimethylsiloxane (X-22-161 B, Shin Etsu, Japan; 0.658 m.equiv NH$_2$ groups/g, M$_n$(VPO)≈2540) are dissolved under nitrogen in 200 ml of dry THF and slowly added dropwise to a suspension of 23.4 g (0.1315 mol) of D(+)gluconic acid δ-lactone in 50 ml of

TABLE 3

| Example | Aminopropyl [A] | Yield of amine | Fluoroalkyl ether [B] | n-Hexyl [C] |
| --- | --- | --- | --- | --- |
| A12 | 6 m. equiv/mmol | 80% | 10 m. equiv/mmol | 6.5 m. equiv/mmol |
| A13 | 7 m. equiv/mmol | 80% | 10 m. equiv/mmol | 5.5 m. equiv/mmol |
| A14 | 8 m. equiv/mmol | 79% | 10 m. equiv/mmol | 4.5 m. equiv/mmol |
| A15 | 9 m. equiv/mmol | 81% | 10 m. equiv/mmol | 3.5 m. equiv/mmol |
| A16 | 9 m. equiv/mmol | 74% | 13.5 m. equiv/mmol | — |
| A17 | 4.5 m. equiv/mmol | 78% | 17 m. equiv/mmol | — | absolute THF and the reaction mixture is then stirred for approximately 12 hours at 25–40° C. until the lactone has reacted fully. (Reaction monitoring by thin-layer chromatography (TLC)). The solvent is then evaporated off and the residue is dried under a high vacuum at 0.03 mbar (3 Pa). A colourless clear rubber-like product is obtained having a carbohydrate content of 10.5% by weight and less than 0.01 m.equiv/g of free (unreacted) amine.

EXAMPLE B3

Analogously to Example B1, 100 g of a polydimethylsiloxane having (an average of) 4.8 pendant 3-aminopropyl groups per molecule (KF-8003, Shin Etsu, Japan; 0.049 m.equiv $NH_2$ groups/g) are dissolved in 100 ml of THF and reacted with a suspension of 10.2 g (0.049 mol) of α-D-heptagluconic acid γ-lactone in 50 ml of THF. The resulting slightly opalescent reaction mixture is filtered over Hyflo and then freed of solvent using a rotary evaporator. There remain behind 107 g of a viscous, rubber-like clear product having a carbohydrate content of 9.3% by weight and less than 0.01 m.equiv/g of free (unreacted) amine.

EXAMPLE B4–B7

Analogously to Example B1, the polydimethylsiloxanes containing 3-aminopropyl groups that are mentioned in Table 4 are reacted with D(+)gluconic acid δ-lactone in 250 ml of absolute THF and in the batch size indicated in Table 4:

TABLE 4

| | PDMS | | | | Batch in g size | | Product | |
|---|---|---|---|---|---|---|---|---|
| Ex. | Name | Type | $M_n$ | $NH_2$* | PDMS | Gluc. | CH content | Appearance |
| B4 | PS-813 | pend | 1200 | 1.6 | 196.3 | 17.6 | 8.23% | c. less clear |
| B5 | GP-4 | pend | 3150 | 2.6 | 200 | 29.5 | 12.85% | c. less clear |
| B6 | GP-6 | pend | 5960 | 3 | 200 | 18.0 | 8.25% | c. less clear |
| B7 | KF-8003 | pend | 9700 | 4.8 | 200 | 16.0 | 7.4% | c. less clear |

$NH_2$* = average number of $NH_2$ groups per molecule
$M_n$ = mean average molecular weight
pend = pendant
c. less = colourless
CH content = carbohydrate content of product in % by weight
Gluc. = D(+)gluconic acid δ-lactone
PS-813 from Petrarch-Hüls
GP-4, GP-6 from Genesee Corporation $NH_2$*=average number of $NH_2$ groups per molecule
$M_n$=mean average molecular weight
pend=pendant
c.less=colourless
CH content=carbohydrate content of product in % by weight
Gluc.=D(+)gluconic acid δ-lactone
PS-813 from Petrarch-Hüls
GP-4, GP-6 from the Genesee Corporation

EXAMPLE B8

The reaction is carried out in accordance with Example B1 but instead of D(+)gluconic acid δ-lactone 75 mmol of lactobionic acid 1,5-lactone suspended in 50 ml of absolute THF are added dropwise to a solution of amino-functionalised polydimethylsiloxane (X-22-161-C) in 180 ml of absolute THF and 20 ml of DMSO (purum, 99%). Amino group titration with perchloric acid indicates a reaction conversion of 99% (>0.01 m.equiv $NH_2$/g). In this case also a colourless optically clear macromer is obtained.

EXAMPLE B9

The reaction is carried out analogously to Example B1.0.1 mol of lactobionic acid 1,5-lactone is suspended in 50 ml of absolute THF and added dropwise to a solution of amino-functionalised polydimethylsiloxane (KF-8003) in 180 ml of absolute THF and 20 ml of DMSO (purum, 99%). The reaction time is extended to approximately 48 hours. A residual content of 0.07 m.eq of $NH_2$/g is detected; it is reacted completely by the addition of the corresponding molar amount of D(+)gluconic acid δ-lactone to the reaction solution. The colourless highly transparent product has a residual content of amino groups of <0.1 m.equiv/g.

EXAMPLE B10

Preparation of

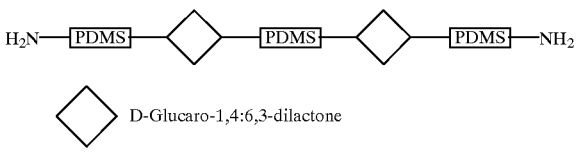

◇ D-Glucaro-1,4:6,3-dilactone

-continued

PDMS  amino-functionalized polydimethylsiloxane

Under a protective gas atmosphere, 52.09 g (9.78 mmol) of purified amino-functionalised polydimethylsiloxane (X-22-161-C, Shin Etsu JP) are dissolved in 110 ml of absolute THF and 1.14 g (6.52 mmol) of D-glucaro-1,4:6,3-dilactone dissolved in 20 ml of absolute THF are added. The reaction solution is stirred at room temperature for 15 hours and then worked up in accordance with Example B1. The amine content is 0.13 m.equiv/g. The terminal amino groups of the resulting pentablock macromer are reacted in the following reaction step with gluconolactone. 41.84 g (5.15 m.eq of $NH_2$) of the above macromer and 917 mg (5.15 mmol) of D(+)gluconic acid δ-lactone are suspended in 300 ml of absolute THF and stirred under nitrogen for 18 hours at 40° C. Then the solution is filtered and concentrated and dried for 48 hours at 3 Pa (0.03 mbar). A highly viscous optically clear substance having a residual content of amino groups of 0.013 m.equiv/g is obtained.

EXAMPLE B11

Analogously to the method known from the literature (Macromolecules 28, 17–24 (1995)), a polydimethylsiloxane having an average molecular weight of approximately 6500 and containing 0.022 m.equiv/g $NH_2$ groups is reacted with maltohexaonolactone in DMSO. When the reaction is complete, aqueous methanol is added repeatedly to the reaction mixture, which causes the product to precipitate. The product is freed of residual solvent under a high vacuum. A highly viscous optically clear substance having a carbohydrate content of 12.6% is obtained.

EXAMPLE B12

20 g (corresponding to 0.016 equiv of OH) of a hydroxypropyl-terminated polydimethyl-siloxane having an average molecular weight of 2540 are dissolved under nitrogen and with stirring in 100 ml of dry DMSO. To that solution, at 15–20° C., there are added 6.97 g (31 mmol) of IPDI and 2 drops of DBTDL as catalyst, and the mixture is stirred for 12 hours to complete the reaction. A solution of an isocyanate-terminated polydimethylsiloxane is obtained which, according to titration, has an OCN content of 0.15 m.equiv. per ml.

EXAMPLES B13 and B14

Analogously to Example B12, but without solvent, other terminal diols are reacted with IPDI

| Example | Diol | OCN content, (m. equiv/g) |
|---|---|---|
| B15 | 1,3-bis-hydroxypropylhexamethyl disiloxane | 2.9 |
| B16 | tetraethylene glycol | 10.5 |

EXAMPLE B15

For the preparation of a β-cyclodextrin-terminated polydimethylsiloxane, 17 g (15 mmol) of 6-amino-β-cyclodextrin are added to the solution prepared in Example B12 (an isocyanate-terminated polydimethylsiloxane) and the reaction mixture is stirred at room temperature under nitrogen for 12 hours. The product is then obtained analogously to Example B11 by repetitive precipitation (5 times) from the reaction mixture with aqueous methanol and dried under a high vacuum at 40° C. (0.1 Pa). 39 g of a whitish elastic product remain behind, the IR spectrum of which does not show an OCN absorption band. In addition, Free amine can no longer be detected by acidimetric titration.

EXAMPLE B16

17.0 g (corresponds to 7.4 m.equiv of amine) of the aminoalkyl-substituted product from Example A15 are dissolved in 20 ml of dried tetrahydrofuran. The solution is repeatedly frozen, degassed and flushed with argon. All the subsequent operations are carried out under an argon atmosphere. Then 1068 mg (6 mmol) of gluconolactone are added. Owing to the poor solubility of the lactone, initially a suspension is obtained. After stirring overnight at 50° C. the solution is clear and all of the lactone has been used up. The stoichiometric residual amount of gluconolactone (260 mg, 1.46 mmol) is then added and stirring is again carried out overnight at 50° C. A trace of unreacted lactone is observed. The complete course of the reaction is monitored by means of thin-layer chromatography (TLC) on silica gel plates with the eluant 1-propanol/ethyl acetate/water (6:1:3). The silica gel plates are developed using Ce(IV) sulfate/phosphomolybdic acid solution. Subsequent titration for amino groups shows a residual amino content of <0.1%.

After filtering and distilling off the solvent, a highly viscous, colourless, clear polymer having 0.435 m.equiv of gluconamide per gram is obtained. The content of unreacted amino groups is determined by base titration and is below the detection limit of 0.1 m.equiv/g.

EXAMPLES B17–B20

The following siloxane polyols containing different amounts of gluconamide are prepared analogously to Example B16:

| Example | $M_n$ | Gluconamide [m. equiv/mmol] | Residual amine content after the reaction |
|---|---|---|---|
| B17 | 10 000 | 4.8 | <0.1 m. equiv/g |
| B18 | 10 000 | 5.6 | <0.1 m. equiv/g |
| B19 | 10 000 | 6.3 | <0.1 m. equiv/g |
| B20 | 10 000 | 7.3 | <0.1 m. equiv/g |

C. Preparation of prepolymers

EXAMPLE C1

In accordance with Example B1, 200 g (85.7 mmol) of purified amino-functionalized poly-dimethylsiloxane (X-22-161-C, Shin Etsu, JP) and 15.3 g (85.7 mmol) of D(+) gluconic acid δ-lactone are reacted in a total of 250 ml of THF, yielding 443 g of a macromer solution of macromer B1 in THF. Under nitrogen there are added to 5.1 g of that solution 62.4 mg (0.28 mmol) of IPDI and 12 mg (0.5%) of DBTDL as catalyst and the reaction mixture is stirred at room temperature (RT) for 2.5 hours to complete the reaction. Then, at RT, the solvent is removed completely using a rotary evaporator. A clear soft rubber-like prepolymer is obtained that is not yet crosslinked and can be dissolved to form a clear solution. According to titration, the prepolymer still contains 0.026 m.equiv/g of reactive isocyanate groups, which corresponds to approximately 40% of the isocyanate equivalent used in total. The prepolymer can be kept at RT for approximately 8–10 hours before gelling begins. Within that time the prepolymer can be processed thermoplastically or as a solution to form a variety of articles and then cured by heat treatment.

EXAMPLES C2 to C6

The following prepolymers C2 to C6 are prepared analogously to Example C1 using the macromer solution from Example C1 and different amounts of IPDI.

| Example | Macromer solution B1 (from Example C1) | IPDI (g) | molar ratio: IPDI per gluconamide |
|---|---|---|---|
| C2 | 2.47 g | 0.249 | 1:1 |
| C3 | 2.47 g | 0.274 | 1.1:1 |
| C4 | 2.47 g | 0.137 | 1.1:1 |
| C5 | 2.47 g | 0.112 | 0.9:2 |
| C6 | 11.66 g | 0.59 | 1:2 |

Clear, soft rubber-like prepolymers are obtained which are not yet crosslinked and can be dissolved to form a clear solution. They are stable at room temperature for several hours.

EXAMPLES C7 to C9

The following polymers C7 to C9 are prepared analogously to Example C1 using the macromer B7 and different amounts of IPDI.

| Example | Macromer solution B7 | IPDI (g) | molar ratio: IPDI per gluconamide |
|---------|----------------------|----------|-----------------------------------|
| C7 | 4.91 g | 0.26 | 1:2 |
| C8 | 4.91 g | 0.21 | 0.8:2 |
| C9 | 4.91 g | 0.19 | 0.7:2 |

Clear, soft rubber-like prepolymers are obtained which are not yet crosslinked and can be dissolved to form a clear solution. They are stable at room temperature for several hours.

EXAMPLE D1

(Films made from prepolymers)

5.17 g of the prepolymer from Example C7 are pressed at 60° C. under a pressure of 0.1 kg/cm$^2$ between two aluminium plates covered with a film of polyethylene phthalate. After 6 hours under those conditions the prepolymer is completely cured (crosslinked). After cooling and removal of the polyester films, a clear rubber-elastic film is obtained the infrared spectrum (IR) of which no longer shows any isocyanate bands. The rubber-elastic film has the following properties:

| | |
|---|---|
| Film thickness: | 300 μm |
| Shore A hardness: | 54 |
| Uncrosslinked components: | 4.4% by weight (determined by extraction with isopropanol, 24 hrs) |

EXAMPLES D2–D4

Analogously to Example D1, crosslinked films are made with the following prepolymers:

| Example | Prepolymer | Shore A hardness | Film thickness in μm | Extractable, content % by weight |
|---------|------------|------------------|----------------------|----------------------------------|
| D2 | C5 | 38 | 650 | 9.3 |
| D3 | C6 | 45 | 600 | 7.6 |
| D4 | C8 | 46 | 660 | 4.7 |

EXAMPLE D5

(Contact lenses made from prepolymers)

5.1 g of the prepolymer described in Example C9 and 6.9 g of dry THF are used to prepare a solution still containing 25 mg of DBTDL from the prepolymer preparation process. Under dry nitrogen, the solution is filtered through a 0.45 μm ultrafiltration membrane. Then, under sterile and dust-free conditions, in a laminar-flow box, 200 μl of the above solution are introduced into each of 50 contact lens moulds made from polypropylene. By passing a stream of dry nitrogen over the moulds while they are still open, all of the solvent, THF, is removed (monitored by weight). The moulds are then closed and clamped in brass retaining means which hold the moulds tightly shut by means of a strong spring-pressure mechanism. The lenses are cured by heating at 60–65° C. for 6 hours under dry nitrogen. When the moulds have been cooled and opened, the resulting totally clear, soft and flexible lenses are extracted for 24 hours with isopropanol. After drying for 12 hours at 0.1 torr (13 Pa), the lenses are autoclaved in phosphate-buffered physiological sodium chloride solution at pH 7.4 and 120° C. for 30 minutes. The properties of the soft contact lenses thus produced are as follows:

| | | | |
|---|---|---|---|
| Lens diameter | 14.0 mm | Modulus of elasticity | 0.92 MPa |
| Base curve | 8.4 mm | Elongation at break | 225% |
| Lens thickness | 90 μm | Shore A hardness | 43 |
| Extractable portions in % by weight | 5.2 | Water absorption | 2.9% by weight |
| Oxygen permeability (dry) | | | 487 barrers |
| Oxygen permeability (hydrated**) | | | 183 barrers |

(** Wet measurement in accordance with ASTM standard)

EXAMPLES D6 and D7

Production of Contact Lenses by Compression Moulding of Prepolymer Films and Thermal Curing Using Metal Moulds (Specifications Below)

Circular discs 5 mm in diameter are punched from the crosslinked film produced in Example D2. Those prepolymer blanks are then placed, under nitrogen, in contact lens moulds (D6: high-polished aluminium; D7 hard-chrome-plated brass) preheated to 40–45° C. The moulds are closed, loaded with a pressure of 200 bar and then heated at 60–65° C. After 60 minutes under those conditions the moulds are cooled and opened and the lenses are caused to swell by placing the mouldings in isopropanol. The lenses are extracted, dried and autoclaved as described in Example D5. The properties of the lenses obtained are as follows:

| | Example D6 | Example D7 |
|---|---|---|
| Lens diameter (mm) | 14.0 | 14.1 |
| Base curve (mm) | 8.4 | 8.4 |
| Modulus of elasticity (MPa) | 0.9 | 0.92 |
| Elongation at break (%) | 350 | 370 |
| Shore A hardness | 26 | 28 |
| O$_2$ permeability (dry) | 458 barrers | 469 barrers |
| O$_2$ permeability (wet, ASTM) | 155 barrers | 159 barrers |

EXAMPLE D9

Contact lenses are prepared analogously to Example D6 and D7 from an uncrosslinked film (prepolymer film). A hot punch tool preheated to 60–65° C. is used, the high-polished V4A steel die and counterpart of which together form a contact lens mould. By adhering to the described curing conditions, it is thus possible to produce from a prepolymer film directly in one operation contact lenses having analogous properties.

EXAMPLES D10 to D13

(Coatings)

A variety of shaped articles made from glass or metal are coated with a thin prepolymer layer by treatment with a 10% solution of the prepolymer described in Example C7 in dry THF and subsequent evaporation of the solvent. Thermal curing of the coatings under the conditions described in Example D5 yields transparent water-repellant coatings that adhere strongly to the substrate and have good long-term stability.

Example D10: silicon water (area 3.5×1.5 cm, thickness 0.54 mm) coated by spin coating Example D11: glass fibres coated by immersion Example D12: glass slide coated by spraying Example D13: aluminium foil coated by spin coating Crosslinking with diisocyanate

EXAMPLE D14

6.7 g of gluconamido-functionalized siloxane macromer (corresp. to 2.935 m.eq of gluconamide) from Example B22 are degassed under a high vacuum and dissolved under argon in 3.35 ml of dimethoxyethane. Then 34 mg of dibutyltin dilaurate, as catalyst, are dissolved in the macromer solution and, finally, 2.33 ml of a 14% isophorone diisocyanate solution in tetrahydrofuran are added and mixing is carried out (corresponding to 1.468 mmol of diisocyanate). That corresponds to a ratio of one molecule of diisocyanate to two gluconamide groups.

The homogeneous solution is filtered and pipetted into polypropylene moulds for the production of lenses or discs. The macromer/monomer mixture is heated under a nitrogen atmosphere for 18 hours in a circulating air oven at 65° C. and crosslinked by reaction of the isocyanate groups with hydroxy groups of the gluconolactone substituents on the macromer. When the moulds have been opened, the lenses and discs are removed and extracted in ethanol for 24 hours. By weighing dried discs before and after the extraction, an extractable content of 5.6 percent by weight is determined. After the extraction, the lenses and discs are dried and autoclaved in phosphate-buffered physiological sodium chloride solution for 30 minutes at 121° C. Clear and colourless lenses and discs having an oxygen permeability of 266 barrer units and a elongation at break of 120% are obtained.

EXAMPLE D15

6.669 g of gluconamido-functionalised siloxane macromer (corresp. to 2.154 m.eq of gluconamide) from Example B20 are degassed under a high vacuum and dissolved under argon in 3.33 ml of dimethoxyethane. Then 34 mg of dibutyltin dilaurate, as catalyst, are dissolved in the macromer solution and, finally, 1.71 ml of a 14% isophorone diisocyanate solution in tetrahydrofuran are added and mixing is carried out (corresp. to 1.08 mmol of diisocyanate). That corresponds to a ratio of one molecule of diisocyanate to two gluconamide groups. The homogeneous solution is filtered and pipetted into polypropylene moulds for the production of lenses or discs. The macromer/monomer mixture is heated under a nitrogen atmosphere for 18 hours in a circulating air oven at 65° C. and crosslinked by reaction of the isocyanate groups with hydroxy groups of the gluconolactone substituents on the macromer. When the moulds have been opened, the lenses and discs are removed and extracted in ethanol for 24 hours. By weighing dried discs before and after the extraction, an extractable content of 8.2 percent by weight is determined. After the extraction, the lenses and discs are dried and autoclaved in phosphate-buffered physiological sodium chloride solution for 30 minutes at 121° C. Clear and colourless lenses and discs having an oxygen permeability of 375 barrer units and a elongation at break of 460% are obtained.

EXAMPLE D16

A polymer film is produced by direct crosslinking of a siloxane-polyol macromer with a diisocyanate in a solvent without isolation of the prepolymer (ratio gluconamide: diisocyanate=2:1).

Under dry nitrogen, 1.23 g of IPDI and 121 mg of DBTDL are added to 34.5 g of a 66.66% solution of the polysiloxane-polyol macromer described in Example B7 in dry 1,2-dimethoxyethane. Under dry nitrogen, the solution is introduced into disc moulds made from polypropylene (2 cm in diameter) which can be clamped in a brass frame in such a manner that they are held tightly shut by a spring mechanism. As described in Example D14, the polymer solution is thermally crosslinked. The resulting discs (polymer discs, 2 cm in diameter, 0.5 mm thick) are extracted with ethanol for 24 hours and then dried in vacuo. The resulting colourless and highly transparent film discs have the following properties:

|  | dry | hydrated (wet) |
|---|---|---|
| Shore A hardness | 56 | 48 |
| modulus of elasticity (MPa) | 2.2 | 1.2 |
| elongation at break (%) | 140 | 180 |
| water absorption (% by weight) | 2.8 | — |
| oxygen permeability (barrers) | 440 | 183 |

EXAMPLES D17 to D39

Other crosslinked polymer films are prepared analogously to Example D16, the ratio of polyol component to diisocyanate, the solvent and the structures and molecular weights of the polysiloxane, polyol and diisocyanate components being varied.

| Example | Macromer | Diisocyanate | M:D | Solvent | Shore A hardness | Modulus of elasticity (MPa) |
|---|---|---|---|---|---|---|
| D17 | B7 | IPDI | 2:0.6 | THF | 41 | 0.82 |
| D18 | B7 | B15 | 2:0.6 | THF | 34 | 0.38 |
| D19 | B2 | IPDI | 2:1 | THF | 53 | 1.6 |
| D20 | B4/B1 (7:3) | IPDI | 2:1 | THF | 45 | — |
| D21 | B4/B1 (7:3) | IPDI | 2:1 | THF | 52 | — |
| D22 | B7 | TDI | 2:0.5 | THF | 38 | 0.75 |
| D23 | B7 | TMHDI | 2:0.5 | THF | 38 | 0.7 |
| D24 | B7 | B15 | 2:0.6 | THF | 34 | 0.38 |
| D25 | B7 | B15 | 2:0.5 | THF | 27 | 0.4 |
| D26 | B3 | IPDI | 2:1 | THF | 59 | — |
| D27 | B5 | IPDI | 2:1 | THF | 48 | — |
| D28 | B6 | IPDI | 2:1 | THF | 43 | — |
| D29 | B7 | B16 | 2:1 | THF | 29 | — |
| D30 | B7 | DCMDI | 2:1 | THF | 42 | 0.9 |
| D31 | B7 | DCMDI | 2:0.6 | THF | 38 | — |
| D32 | B7 | IPDI | 2:0.8 | DMOE | 43 | 1.05 |
| D33 | B7 | IPDI | 2:1.1 | DMOE | 51 | 1.6 |
| D34 | B7/B1 (1:1) | IPDI | 2:1 | DMOE | 55 | 1.8 |
| D35 | B7/B1 (3:7) | IPDI | 2:1 | DMOE | 57 | — |
| D36 | B11 | IPDI | 2:1 | DMOE | 65 | 2.1/1.2* |
| D37 | B11 | IPDI | 2:0.8 | DMOE | 55 | — |
| D38 | B17 | IPDI | 2:1 | DMOE | 63 | — |
| D39 | B13 | IPDI | 2:1 | DMOE | 46* | 1.1* |

Legend:

* denotes measurement after hydration (wet measurement)

DMOE: dimethoxyethane

DCMDI: dicyclohexylmethane-4,4'-diisocyanate

TMHDI: 2,2,4-trimethylhexane-1,6-diisocyanate

TDI: toluene-2,4-diisocyanate
M:D is the molar ratio of polyol segment to diisocyanate EXAMPLES D40 to D44

As described in Example D16, a solution of a polysiloxane-polyol macromer and a diisocyanate and a catalyst in DMOE is prepared. The solution is introduced under dry nitrogen into contact lens moulds made from polypropylene and polymerised as described in Example D16. The lenses, still swollen in DMOE, are extracted, dried and then autoclaved in physiological sodium chloride solution (phosphate buffer, pH=7.4) for 30 minutes at 121° C. as described in Example D16. The formulations and the properties of the contact lenses thus produced are given below. The thickness of the lenses is 65–70 μm.

| | Starting materials from | $O_2k$ Dk (barrers) | Modulus of elasticity (MPa) | Shore A hardness | Water absorption (% by weight) |
|---|---|---|---|---|---|
| D40 | D16 | 330/170** | 1.75/0.95** | 52/45** | 1.9 |
| D41 | D18 | 390/187** | 0.45/0.24** | 34/22** | 3.8 |
| D42 | D24 | 430/230** | 0.42/0.38** | — | 1.0 |
| D43 | D37 | 387/154** | 2.6/1.6** | 50/36** | 7.3 |
| D44 | D39 | 354/141** | 1.7/1.1** | 46/32** | 11.2 |

$O_2$Dk: oxygen permeability
**denotes measurement after hydration $O_2$Dk: oxygen permeability
** denotes measurement after hydration

What is claimed is:

1. A polymer comprising a polymerisation product of at least one macromer that comprises at least one section of formula (I)

$$-a-Z-b- \quad (I),$$

wherein
   (a) is a polysiloxane segment containing at least one primary amino group or at least one hydroxy group,
   (b) is a polyol segment containing at least 4 carbon atoms,
   Z is a segment (c) or a group $X_1$,
   segment (c) being defined as $X_2$-R-$X_2$ wherein R is a bivalent radical of an organic compound having up to 25 carbon atoms and each $X_2$ independently of the other is a bivalent radical having at least one carbonyl group, and $X_1$ having the same meaning as $X_2$; with a polyisocyanate.

2. A polymer according to claim 1 wherein the polyisocyanate is a diisocyanate or a triisocyanate.

3. A polymer according to claim 2 wherein the triisocyanate is a compound

OCN—T(—NCO)—NCO and T is an organic radical having up to 50 carbon atoms.

4. A polymer according to claim 2 wherein the diisocyanate is a compound OCN—R—NCO and R is a bivalent radical of an organic compound having up to 25 carbon atoms.

5. A polymer according to claim 4 wherein the di-radical R in the diisocyanate OCN—R—NCO is alkylene that may be interrupted one or more times by a bivalent structural unit Y, Y being selected from di-lower alkylsilyl and di-lower alkylsilyloxy, or R may be arylene, alkylenearylene, arylenealkylene or arylenealkylenearylene having up to 20 carbon atoms, a saturated bivalent cycloaliphatic group having from 6 to 20 carbon atoms, or cycloalkylenealkylenecycloalkylene having from 7 to 20 carbon atoms; wherein lower alkyl is defined as having up to eight carbon atoms.

6. A polymer according to claim 5 wherein Y is dimethylsilyl or dimethylsilyloxy.

7. A polymer according to claim 4 wherein the di-radical R in the diisocyanate OCN—R—NCO is alkylene that may be interrupted one or more times by a bivalent structural unit Y, Y being selected from di-lower alkylsilyl and di-lower alkylsilyloxy, or R may be arylene, alkylenearylene, arylenealkylene or arylenealkylenearylene having up to 14 carbon atoms, or a saturated bivalent cycloaliphatic group having from 6 to 14 carbon atoms; wherein lower alkyl is defined as having up to eight carbon atoms.

8. A polymer according to claim 4 wherein the di-radical R in the diisocyanate OCN—R—NCO is alkylene that may be interrupted one or more times by a bivalent structural unit Y, Y being selected from di-lower alkylsilyl and di-lower alkylsilyloxy, or R may be arylene, alkylenearylene or arylenealkylene having up to 14 carbon atoms, or a saturated bivalent cycloaliphatic group having from 6 to 14 carbon atoms; wherein lower alkyl is defined as having up to eight carbon atoms.

9. A polymer according to claim 4 wherein the di-radical R in the diisocyanate OCN—R—NCO is alkylene or arylene having up to 12 carbon atoms, or a saturated bivalent cycloaliphatic group having from 6 to 14 carbon atoms.

10. A polymer according to claim 4 wherein the di-radical R in the diisocyanate OCN—R—NCO is alkylene or arylene having up to 10 carbon atoms, or a saturated bivalent cycloaliphatic group having from 6 to 10 carbon atoms.

11. A polymer accordingly to claim 1 wherein the content by weight of the macromer relative to the total polymer is in the range from 99 to 5%, and the balance to 100% by weight being formed by the polyisocyanate.

12. A polymer according to claim 1 wherein the polysiloxane segment (a) is the radical of a compound of formula (II)

$$R_1-\underset{\underset{R_3}{|}}{\overset{\overset{R_2}{|}}{Si}}-\left[O-\underset{\underset{R_5}{|}}{\overset{\overset{R_4}{|}}{Si}}\right]_n-R_6, \quad (II)$$

wherein n is an integer from 5 to 500; 99.8–25% of the radicals $R_1$, $R_2$, $R_3$, $R_4$, $R_5$ and $R_6$ are each independently of the others alkyl and 0.2–75% of the radicals $R_1$, $R_2$, $R_3$, $R_4$, $R_5$ and $R_6$ are each independently of the others partially fluorinated alkyl, aminoalkyl, alkenyl, aryl, cyanoalkyl, Alk-NH-Alk-$NH_2$ or Alk-$(OCH_2CH_2)_m$—$(OCH_2)_p$—$OR_7$, wherein $R_7$ is hydrogen or lower alkyl, Alk is alkylene, m and p are each independently of the other an integer from 0–10; and the compound of formula (II) contains at least one primary amino group or at least one hydroxy group.

13. A polymer according to claim 12 wherein the polysiloxane segment (a) is the radical of a compound of formula (II) wherein from 1 to 50 of the radicals $R_1$, $R_2$, $R_3$, $R_4$, $R_5$, and $R_6$ are each independently of the others, either terminal or pendant aminoalkyl or hydroxyalkyl.

14. A polymer according to claim 12 wherein the polysiloxane segment is the radical of a compound of formula (II)

wherein 95–29% of the radicals $R_1$, $R_2$, $R_3$, $R_4$, $R_5$ and $R_6$ are each independently of the others alkyl and 5–71% of the radicals $R_1$, $R_2$, $R_3$, $R_4$, $R_5$ and $R_6$ are each independently of the others partially fluorinated alkyl, aminoalkyl, alkenyl, aryl, cyanoalkyl, Alk-NH-Alk-NH$_2$ or Alk-(OCH$_2$CH$_2$)$_m$—(OCH$_2$)$_p$—OR$_7$.

15. A polymer according to claim 12 wherein n is an integer from 5 to 400.

16. A polymer according to claim 12 wherein the two terminal radicals $R_1$ and $R_6$ are aminoalkyl or hydroxyalkyl.

17. A polymer according to claim 12 wherein from 1 to 50 of the radicals $R_4$ and $R_5$ are pendant aminoalkyl or hydroxyalkyl.

18. A polymer according to claim 1 wherein the polysiloxane segment (a) is linked a total of 1 to 50 times via a group Z to a segment (b) or to a further segment (a); provided that if a segment (a) is linked to a further segment (a), then Z is a segment (c).

19. A polymer according to claim 1 wherein in a segment (a) the site of linkage to a group Z is an amino or hydroxy group reduced by a hydrogen atom.

20. A polymer according to claim 1 wherein Z is $X_1$ and $X_1$ is a bivalent radical having at least one carbonyl group.

21. A polymer according to claim 20 wherein the carbonyl group is flanked at most twice by +O—, —CONH—, —NHCO— or —NH—.

22. A polymer according to claim 20 wherein the bivalent group Z is an ester, amide, urethane or urea group.

23. A polymer according to claim 1 wherein $X_1$ and $X_2$ independently an ester, amide, urethane, carbonate or urea group.

24. A polymer according to claim 1 wherein Z in formula (I) is $X_1$ and the polyol segment (b) is the radical of a carbohydrate, a carbohydrate monolactone or a carbohydrate dilactone.

25. A polymer according to claim 1 wherein the polyol segment (b) is the radical of a polyol that does not carry a lactone group and wherein the group Z is a segment (c).

26. A polymer according to claim 1 wherein in a segment (b) the site of linkage to a segment (c) is an amino or hydroxy group reduced by a hydrogen atom.

27. A polymer according to claim 1 wherein the di-radical R is alkylene that may be interrupted one or more times by a bivalent structural unit Y, Y being selected from di-lower alkylsilyl and di-lower alkylsilyloxy, or R may be arylene, alkylenearylene, arylenealkylene or arylenealkylenearylene having up to 20 carbon atoms, a saturated bivalent cycloaliphatic group having from 6 to 20 carbon atoms, or cycloalkylenealkylenecycloalkylene having from 7 to 20 carbon atoms; wherein lower alkyl is defined as having up to eight carbon atoms.

28. A polymer according to claim 27 wherein Y is dimethylsilyl or dimethylsilyloxy.

29. A polymer according to claim 1 wherein R is alkylene that may be interrupted one or more times by a bivalent structural unit Y, Y being selected from di-lower alkylsilyl and di-lower alkylsilyloxy, or R may be arylene, alkylenearylene, arylenealkylene or arylenealkylenearylene having up to 14 carbon atoms, or a saturated bivalent cycloaliphatic group having from 6 to 14 carbon atoms; wherein lower alkyl is defined as having up to eight carbon atoms.

30. A polymer according to claim 1 wherein R is alkylene or arylene having up to 12 carbon atoms, or a saturated bivalent cycloaliphatic group having from 6 to 14 carbon atoms.

31. A polymer according to claim 1 wherein a segment (c) is the bivalent radical of hexane-1,6-diisocyanate, 2,2,4-trimethylhexane-1,6-diisocyanate, 1,3-bis(3-isocyanatopropyl)tetramethyldisiloxane, tetramethylene diisocyanate, phenylene-1,4-diisocyanate, toluene-2,4-diisocyanate, toluene-2,6-diisocyanate, m- or p-xylene diisocyanate, isophorone diisocyanate, cyclohexane-1,4-diisocyanate, 1,5-naphthylene diisocyanate, 4,4'-diphenylmethane diisocyanate, 4,4'-diphenylsulfone diisocyanate or 4,4'-dicyclohexylmethane diisocyanate.

32. A polymer according to claim 4 wherein the diisocyanate is hexane-1,6-diisocyanate, 2,2,4-trimethylhexane-1,6-diisocyanate, 1,3-bis(3-isocyanatopropyl) tetramethyldisiloxane, tetramethylene diisocyanate, phenylene-1,4-diisocyanate, toluene-2,4-diisocyanate, toluene-2,6-diisocyanate, m- or p-xylene diisocyanate, isophorone diisocyanate, cyclohexane-1,4-diisocyanate, 1,5-naphthylene diisocyanate, 4,4'-diphenylmethane diisocyanate, 4,4'-diphenylsulfone diisocyanate or 4,4'-dicyclohexylmethane diisocyanate.

33. A polymer according to claim 1 wherein the mean molecular weight of the macromer is in the range from approximately 300 to approximately 30 000.

34. A polymer according to claim 1 wherein the ratio of segments (a) and (b) in the macromer is in a range of (a):(b)=3:4, 2:3, 1:2, 1:1, 1:3 or 1:5.

35. A polymer according to claim 1 wherein the sum total of segments (a) and (b) or, where appropriate, (a) and (b) and (c) is in a range from 2 to 50.

36. A moulded article consisting essentially of a polymer according to claim 1.

37. A moulded article according to claim 36 which is a contact lens.

38. A moulded article according to claim 36 which is a soft contact lens having a water content of from 1 to 40% by weight.

39. A moulded article according to claim 36 which is a low water content flexible gas permeable contact lens.

40. A moulded article according to claim 36 which is an intraocular lens.

41. A biomedical article consisting essentially of a polymer according to claim 1.

42. A coating on the surface of an article comprising the polymer of claim 1.

43. A corneal implant consisting essentially of a polymer according to claim 1.

44. A corneal implant according to claim 43 which can be used in surgical implants on or in the cornea of a warm-blooded animal, wherein the mentioned implant has in the region over the optical axis an optical property that is suitable for imparting sharpness of vision, and also a porosity that is sufficient to allow the passage of components of tissue fluid having a molecular weight greater than 100 000 dalton, the passage of tissue fluid from cells outside the implant to cells inside the implant being ensured, and wherein the porosity in the region over the optical axis is such that the passage of components of tissue fluid is possible but the growth of ocular tissue is excluded.

45. A corneal implant according to claim 43, the implant being coated with one or more components that promote the growth of tissue in the vicinity of the implant and/or that promote the adherence of cells to the implant.

46. A corneal implant according to claim 43 wherein the porosity of the implant is provided by a plurality of pores the size of which is sufficient to ensure the passage through the implant of protein components of tissue fluid having a molecular weight greater than 10 000 dalton, but the size of which excludes the possibility of the growth of tissue.

47. A corneal implant according to claim 46 wherein the majority of the pores have a diameter of from 15 nanometres to 0.5 micrometres, preferably from 150 nanometres to 0.5 micrometres.

48. A cell growth substrate comprising a polymer as defined in claim 1.

49. A medical implant comprising a polymer as defined in claim 1.

50. A process for the preparation of a prepolymer which process comprises adding to a macromer as defined in claim 1 a polyisocyanate, in the presence or absence of a solvent.

51. A process for the preparation of a polymer which comprises mixing a macromer as defined in claim 1 with a polyisocyanate in the presence or absence of a solvent, if necessary adding a suitable catalyst and then, if necessary, heating the reaction mixture.

52. A prepolymer containing at least one free isocyanato group, consisting of the addition product of a macromer containing at least one section of formula (I)

-a-Z-b-  (I), wherein
 (a) is a polysiloxane segment containing at least one primary amino group or one hydroxy group,
 (b) is a polyol segment containing at least 4 carbon atoms,
 Z is a segment (c) or a group $X_1$,
 segment (c) being defined as $X_2$-R-$X_2$ wherein R is a bivalent radical of an organic compound having up to 20 carbon atoms and each $X_2$ independently of the other is a bivalent radical having at least one carbonyl group, and $X_1$ having the same definition as $X_2$; and a polyisocyanate.

53. A process for the preparation of a polymer wherein a prepolymer according to claim 52 is crosslinked.

54. A process according to claim 53 wherein the the prepolymer is crosslinked by an increase in pressure or in temperature or both.

55. A coating on the surface of an article comprising the prepolymer of claim 52.

* * * * *